United States Patent
Poder et al.

(10) Patent No.: US 10,069,916 B2
(45) Date of Patent: Sep. 4, 2018

(54) SYSTEM AND METHOD FOR TRANSPARENT CONTEXT AWARE FILTERING OF DATA REQUESTS

(71) Applicant: GLUENT INC., Dallas, TX (US)

(72) Inventors: Tanel Poder, Irving, TX (US); Paul Robert Bridger, Lower Hutt (NZ); Adrian Brian Billington, Buckinghamshire (GB)

(73) Assignee: GLUENT, INC., Dallas, TX (US)

( * ) Notice: Subject to any disclaimer, the term of this patent is extended or adjusted under 35 U.S.C. 154(b) by 280 days.

(21) Appl. No.: 15/166,137

(22) Filed: May 26, 2016

(65) Prior Publication Data

US 2016/0350385 A1    Dec. 1, 2016

Related U.S. Application Data

(60) Provisional application No. 62/166,460, filed on May 26, 2015.

(51) Int. Cl.
  *G06F 17/30*  (2006.01)
  *G06F 3/06*   (2006.01)
  *H04L 29/08*  (2006.01)

(52) U.S. Cl.
  CPC ........ *H04L 67/1097* (2013.01); *G06F 3/0649* (2013.01); *G06F 17/30073* (2013.01); *G06F 17/30221* (2013.01); *G06F 17/30477* (2013.01); *G06F 17/30566* (2013.01); *G06F 17/30584* (2013.01); *G06F 17/30864* (2013.01); *H04L 67/327* (2013.01)

(58) Field of Classification Search
  CPC ......... G06F 17/30221; G06F 17/30073; G06F 17/30477; G06F 17/30566; G06F 17/30584; G06F 3/0649
  See application file for complete search history.

(56) References Cited

U.S. PATENT DOCUMENTS

| | | |
|---|---|---|
| 8,533,163 B2 | 9/2013 | Feeney et al. |
| 2004/0215604 A1* | 10/2004 | Ivanov ............. G06F 17/30424 |
| 2009/0089312 A1 | 4/2009 | Chi et al. |
| 2012/0203781 A1 | 8/2012 | Wakefield |
| 2012/0323977 A1 | 12/2012 | Fortier et al. |
| 2013/0172011 A1 | 7/2013 | Ortiz |

OTHER PUBLICATIONS

International Search Report and Written Opinion for PCT/US2016/034487, dated Aug. 16, 2016 (9 pages).

* cited by examiner

*Primary Examiner* — William Spieler
(74) *Attorney, Agent, or Firm* — Eversheds-Sutherland (US) LLP

(57) ABSTRACT

This disclosure describes a method, device, and system related to filtering data requests. The system may determine a first data request from the at least one first server. The system may cause to send a second data request to the at least one first server for one or more first instructions. The system may further determine the one or more first instructions from the at least one first server. The system may cause to send a third data request to the at least one first storage device for data corresponding to the first data request. The system may determine the data from the at least one first storage device using the third data request. The system may further send a first data set of the data to the at least one first server.

18 Claims, 9 Drawing Sheets

SYSTEM AND METHOD FOR TRANSPARENT CONTEXT AWARE FILTERING OF DATA REQUESTS

CROSS REFERENCE TO RELATED APPLICATION

This application claims the benefit of U.S. patent application Ser. No. 62/166,460 filed on May 26, 2015, the disclosure of which is incorporated herein by reference as set forth in full.

TECHNICAL FIELD

This disclosure generally relates to systems and methods for managing distributed storage and more particularly, transparent context aware filtering of data requests.

BACKGROUND

Some distributed storage management systems are used to fetch data from distributed storage devices for user devices requesting the data for one or more applications that require the data for execution. Distributed storage management systems typically include one or more servers that may be used by user devices to request data, one or more servers that may fetch the data from one or more storage devices based on the data requested, and one or more storage devices that may store the requested data. The user devices may request data for the one or more applications, from the one or more storage devices, and may receive the requested data in addition to other data that was not requested for the one or more applications. That is, the one or more storage devices may receive a request from the one or more servers for the requested data, but may return the requested data that may be stored in a location with additional data. Some distributed storage management systems may include storage devices that return the additional data including the relevant data, because the storage devices are unable to differentiate between relevant and irrelevant (additional) data as they do not understand the application data storage format nor have visibility into which data is relevant to any particular application data retrieval request. The bandwidth required to transfer the additional data from the storage devices to the one or more servers is greater than the bandwidth required to transfer the relevant data. Also, the less data gets returned to the requesting application by the storage devices, the less resources (CPU, RAM) will the requesting application consume while processing only the relevant data sent to it by the storage devices.

Data stores in enterprise architectures may be implemented using vendor specific databases and storage infrastructure. The increasing volumes of data and data retention requirements are stretching the costs and capabilities of data stores. For example, financial services companies may be required by law (e.g., Sarbanes-Oxley Act or the Basel Accords) to retain customer (e.g., institutional customers such as Goldman Sachs and retail customers such as an individual banking at retail branch office of Bank of America) data (e.g., financial transactions) for up to a predetermined period of time, often for multiple years. In other examples, telecommunications companies may also be required by law to retain customer data for up to a predetermined period of time as well for investigative purposes. For example, if an attack were to take place on a Federal building, law enforcement may be able to use telephone records to determine who may have committed the act.

Other reasons for increased data retention requirements are general business growth and increased need for understanding customer behavior for staying competitive. For example, thanks to "360-degree view of a customer" requirements in, companies are ingesting and retaining records from ever-increasing number of channels and never deleting data. Manufacturing companies are keeping all records, quality control images and measurements throughout the entire manufacturing process. This allows them to perform more efficient fault detection and provide detailed feedback for quality control, therefore increasing product quality, manufacturing efficiency and reduce maintenance and customer support costs.

Companies look for ways to move some of their data and/or workloads from expensive, proprietary relational database management (RDBMS) and storage area network (SAN) systems to cheaper, open systems such as those made possible by Big Data and Cloud ecosystems. There are several SQL engines for these new "backend" ecosystems (such as Cloudera's Impala and HortonWorks' Hive), although none are currently as mature or as sophisticated as those provided by traditional RDBMS databases. As a result, when a company's volume of data grow they may either re-engineer their existing applications, reporting, and archival systems to exploit new Big Data/Cloud technologies or continue paying fees for RDBMS licenses and SAN storage hardware. Most companies will not re-architect their enterprise systems and all of their applications, data flows, reporting and archiving solutions in favor of using only the Big Data or Cloud solutions. As a result RDBMSs will continue to be a critical part of company enterprise systems. However, some RDBMSs may incorporate new data architectures, as more enterprise data is collected, stored, analyzed and archived centrally in large processing clusters.

As the amount of data collected increases, enterprise systems may begin to offload volumes of data from their application databases to backend Big Data clusters (e.g., data lakes) to be used/consumed by applications that analyze, post-process and distribute the data to applications or Cloud storage for online archival. The enterprise systems will simultaneously need to provide the same data to the applications generating the data. As a result, user devices, and more specifically application databases executing application queries on behalf of the user devices, need to be able to query data from any source database within any application and database (e.g., consumer database) with the minimum amount of latency and processing overhead in the application and consumer database. For example, an application on a user device must be able to read/request data from a source database on a storage device with the minimum amount of latency in requesting the data, receiving the data, storing the data, and processing the data.

Although RDBMS, BigData, and Cloud ecosystems are viable options, other distributed storage systems are increasingly becoming options that companies are investing in. Companies are selecting these other options because they provide more flexibility in file types that a user (e.g., an application developer or data scientist) may find easier to work with when developing applications. For example, a data scientist interested in analyzing data collected by one or more sensors may find it easier to work with data in a file format such as a comma separated value (CSV) file format, JavaScript object notation (JSON) file format, extensible markup language (XML) file format, and/or tab separated value (TSV) file format. Another example would be cloud-first data collection agents that collect Internet-of-Things data or weblogs into simple Cloud object store platforms such as Amazon S3 directly. A data scientist may want to read and process subsets or aggregates of these logs directly from the object store, without having to first load the data into some RDBMS or Big Data processing backend. Some RDBMSs and Cloud ecosystems require a user to use a proprietary file format when developing applications that require access to data stored on these (RDBMS and Cloud ecosystems). Accordingly, the user is tasked with developing an interface between the application they are developing and the proprietary file formats or applications running on these systems.

The systems, methods, and devices disclosed herein are platform (e.g., processor and/or operating system) agnostic and therefore are not limited to any specific platforms or architectures of RDBMSs or Cloud ecosystems. The systems, methods, and devices in the instant application provide an interface between user devices, requiring access to data stored on alternative storage devices (e.g., distributed file systems or distributed storage devices), other than RDBMSs and Cloud ecosystems, and the alternative storage devices themselves. Accordingly, the systems, methods, and devices disclosed herein enable the user devices to execute one or more applications requiring data stored in any file format (e.g., CSV, TSV, XML, etc.)

BRIEF DESCRIPTION OF THE DRAWINGS

The detailed description is set forth through reference to the accompanying drawings, which are not necessarily drawn to scale. A brief description of each drawing is provided below. In the drawings, same reference numerals indicate similar or identical elements; however, different reference numerals may be used to indicate similar or identical elements as well.

DETAILED DESCRIPTION

Embodiments of the disclosure can provide distributed storage management systems and methods. In certain embodiments, a distributed storage management system can include one or more servers and/or storage devices using relatively efficient protocols for reading the relevant data from one or more computer-readable media in the storage devices. In certain embodiments, a distributed storage management method can include encoding relevant data read from the one or more computer-readable media, transferring the encoded data, decoding the data, and storing the data on one or more computer-readable media and/or memory in the servers. In certain embodiments, a distributed storage management method can include transparent context aware filtering of data requests Certain embodiments of the disclosure can improve the functionality and/or operations of a computer in itself by reducing the amount of time the computer and/or server needs to transfer relevant data to one or more requesting user devices.

Figure 1:
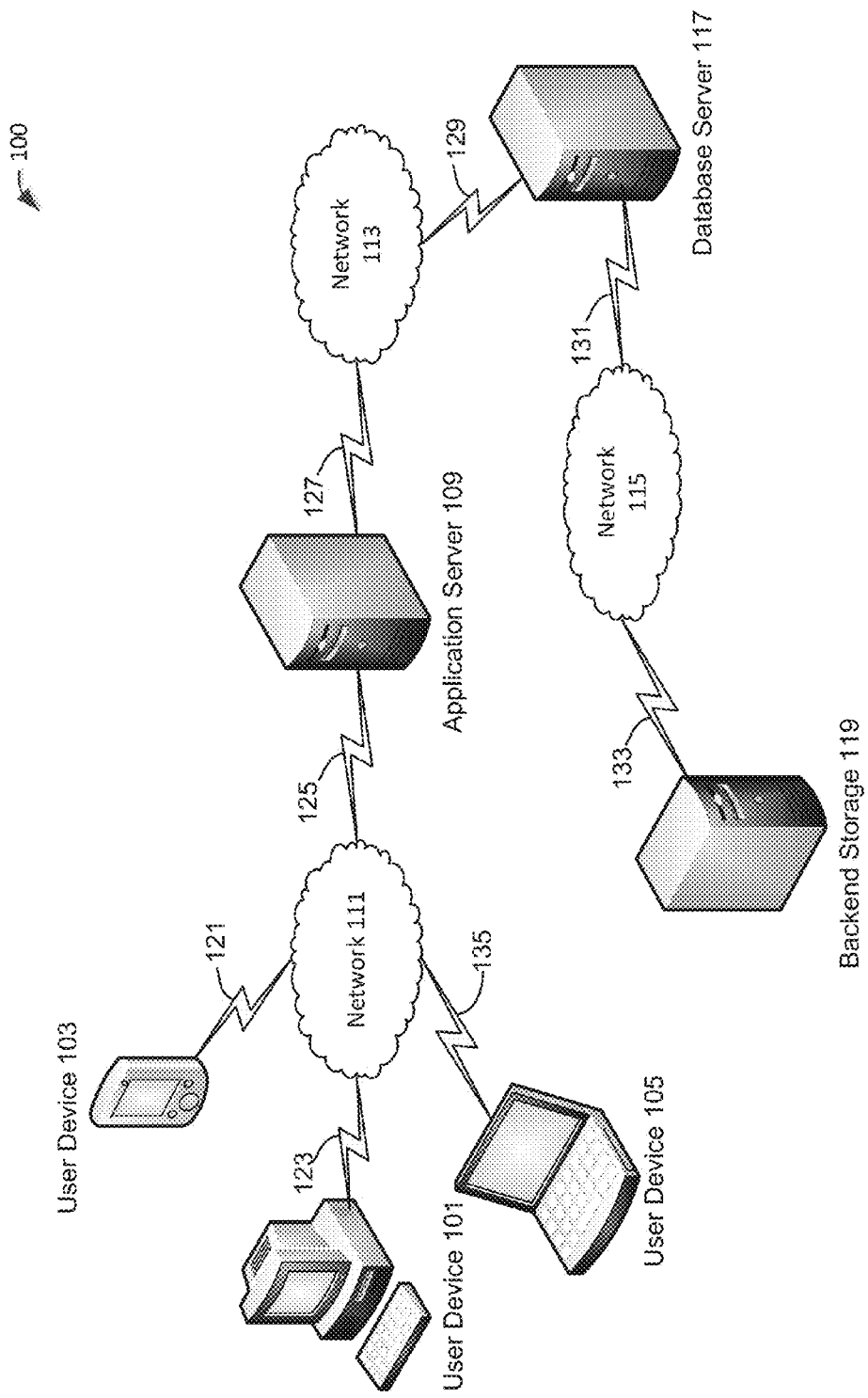
FIG. 1 depicts a network diagram illustrating an example network environment for requesting data from storage device, in accordance with one or more embodiments of the disclosure.

FIG. 1 depicts a network diagram illustrating an example network environment for requesting data from storage device, in accordance with one or more embodiments of the disclosure. While exemplary network environment 100 is directed to a network environment that may include one or more wired or wireless links, it is appreciated that network environment 100 can be any type of network that communicates using packets.

Network environment 100 may include one or more user devices (e.g., User Device 101, User Device 103, User Device 105), an application server (e.g., Application Server 109), a database server (e.g., Database Server 117), a back-end storage device (e.g., Backend Storage 119), and one or more networks (e.g., Networks 111, 113, and 115). One or more of the user devices may communicate with the application server using wireless links and/or wired links. For example, User Device 103 may communicate with Application Server 109 using a wireless connection (e.g., Connection 121) to connect to an access point (not shown), within Network 111, that may communicate with Application Server 109 using a wired connection (e.g., Connection 125), thereby establishing a communication link between User Device 103 and Application Server 109. As another example, User Device 101 may communicate with Application Server 109 using a wired and/or wireless connection (e.g., Connection 123) to connect to a router (not shown) and/or switch (not shown), within Network 111, that may communicate with Application Server 109 using a wired connection (e.g., Wired Connection 125), thereby establishing a communication link between User Device 101 and Application Server 109. As yet another example, User Device 105 may communicate with Application Server 109 using a wired and/or wireless connection (e.g., Connection 135) to connect to a router (not shown) and/or switch (not shown), within Network 111, that may communicate with Application Server 109 using a wired connection (e.g., Connection 125), thereby establishing a communication link between User Device 105 and Application Server 109. In some embodiments, the access point may and switch and/or router may be the same device and may route packets or switch frames between the user devices and the application server. Connection 121 may be implemented using one or more wireless communication standards. In some embodiments, any of the wireless personal area network protocols disclosed in the Wi-Fi Alliance standards, colloquially known as the Institute for Electrical and Electronics Engineers' (IEEE) 802.11 standards, may be used. For example, User Device 103 may connect to Network 111 using the IEEE 802.11 a, b, g, n, ac, ad, af, ah, ai, aj, aq, ax, and/or ay standards. In other embodiments, Connection 121 may be implemented using one or more cellular network standards as well. For example, User Device 103 may connect to Network 111 using Global System for Mobile Communication (GSM), Universal Mobile Telecommunication System (UMTS), Code Division Multiple Access (CDMA), CDMA 2000, and/or Long Term Evolution (LTE). In some embodiments, Connection 123 may be implemented using one or more of the same wireless communication standards used in implementing Connection 121. Connections 123, 125, and 135 may be implemented using one or more wired communication standards. For example, Connections 123, 125, 127, 129, 131, 133, and 135 may be implemented using any of the IEEE 802.1 or 802.3 standards. For instance, Connections 123, 125, and 135 may be implemented using an IEEE 802 Local Area Network (LAN) connection protocol, a IEEE 802 Metropolitan Area Network (MAN) connection protocol, or a Wide Area Network (WAN) connection protocol. Connections 123, 125, and 135 may be implemented using IEEE 802.1 B, D, E, F G, H, Q, X, AB, AC, AE, AR, AS, AX, BA, BR, and/or CB. In some embodiments, Connections 123, 125, 127, 129, 131, 133, and 135 may be implemented using one or more wireless broadband standards. For example, Connections 127 and 129 may be implemented using wireless broadband standard IEEE 802.16, colloquially referred to as Worldwide Interoperability for Microwave Access (WiMAX), and Connections 131 and 133 may be implemented using LTE, High Speed Packet Access (HSPA), or Enhanced Data Rates for GSM Evolution (EDGE).

Networks 111, 113, and 115 may include one or more routers and/or switches that forward or switch packets between two endpoints. For example, Network 113 may route packets and/or switch frames between Application Server 109 and Database Server 117 in either direction (i.e., from Application Server 109 to Database Server 117 and vice versa). In some embodiments, Networks 111, 113, and/or 115 may include one or more cellular masts to provide cellular connectivity between endpoints connected to Networks 111, 113, and/or 115. For example, User Device 103 may be a mobile computing device (e.g., cellular phone) that connects to one or more mobile telecommunication service provider networks by sending and receiving signals to cellular masts in Network 111 associated with the one or more mobile telecommunication service provider networks. In other embodiments, fixed wireless or wired point-to-point links may be used in Networks 111, 113, and/or 115.

Application Server 109 may be a device that can be represented by any electronic addressable format, and can exist as a standalone device, or may be one of several servers in a server farm. Application Server 109 may be a physical and/or virtual server. In some embodiments, Application Server 109 may include a hardware layer, an operating system, and a hypervisor creating or managing one or more virtual machines. Application Server 109 may provide one or more services to one or more user devices. These services may include providing one or more applications to one or more user devices (e.g., User Devices 103, 101, and/or 105). The applications may include, for example, Structured Query Language (SQL) applications. For example, one or more SQL applications may include any application that uses a database. For instance, a customer relationship management (CRM) system, contacts database, company Intranet system, financial services trading application platforms, or reporting applications may be executed on one or more processors using one or more SQL statements. Application Server 109 may send requests/queries to Database Server 117 for data stored either on Database Server 117 or Backend Storage 119 using Network 113. For example, Application Server 109 may receive a request from User Device 105 for data about one or more sales transactions within a month of sales transactions not inclusive of the entire month of sales transactions. For instance, an application executing on User Device 105 may audit the number of sales transactions within a given month wherein the total amount of money received by a business exceeds a certain threshold. Application Server 109 may send a request to Database Server 117 to retrieve the data that may be locally stored on Database Server 117 or stored in a backend storage device (e.g., Backend Storage 119).

Database Server 117 may be a server storing one or more computer-executable instructions or instruction sets in one or more memories that enables the server to provide access to a database stored in computer-readable media in the server to one or more user devices that may connect to the server. The one or more computer-executable instructions or instruction sets may be referred to as a Database Management System (DBMS). In some embodiments, the DBMS may be an open-source RDBMS such as MySQL. The one or more instructions or instruction sets may include one or more query languages. There may be one or more processors on the server that may receive a query from a user device for data, and may convert the query to a format that is compatible with the one or more computer-executable instructions or instruction sets executed by the one or more processors to retrieve data relevant to the request of the user device. In some embodiments, the data requested by the user device may be stored in computer-readable media that may be in the server. For example, there may be one or more hard drives/disks accessible by the one or more processors via a system bus connecting the processor to the one or more hard drives/disks. In some embodiments, the computer-readable media may be one or more physical and/or virtual hard drives/disks. In some embodiments, the one or more physical and/or virtual hard disks may be a part of a storage array such as Network Area Storage (NAS) device or they may be a part of one or more distributed storage devices that are accessible to the server via a network connection (e.g., Network 115). The storage array or distributed storage devices may be referred to as backend storage. In some embodiments, the one or more computer-executable instructions may cause the processor to send a request to one or more processors in the backend storage to read data from the one or more hard disks in response to a request from a user device to retrieve/fetch data from the one or more hard disks. In other embodiments, the one or more computer-executable instructions may cause the processor to a request to the one or more processors in the backend storage to write data to the one or more hard disks in response to a request from the user device to store data on the one or more hard disks.

Backend Storage 119 may include one or more computer-readable media storing data and one or more processors that may read and/or write the data from or to the one or more computer-readable media. The one or more processors may receive a request from one or more processors in a Database Server 117 to read data from the one or more computer-readable media in Backend Storage 119 corresponding to a request transmitted to Database Server 117 from Application Server 109. The request may correspond to an application executing on Application Server 109, and hosted for a user device (e.g., User Device 101). Backend Storage 119 may be a NAS device or a distributed storage device. Even though Backend Storage 119 is depicted by a single device, it is not limited to a single device. For example, Backend Storage 119 may be a distributed storage device that manages a file system spanning one or more server racks distributed throughout the world. For instance, returning to the example above in which a user device (e.g., User Device 105) requests sales data from a backend storage device, the backend storage device may be a file system wherein the files in the file system are distributed across one or more of hard disks belonging to server racks on different continents. As a result, the backend storage device, storing the data requested by the user device, may not be on the same continent as user device requesting the data.

Figure 2:
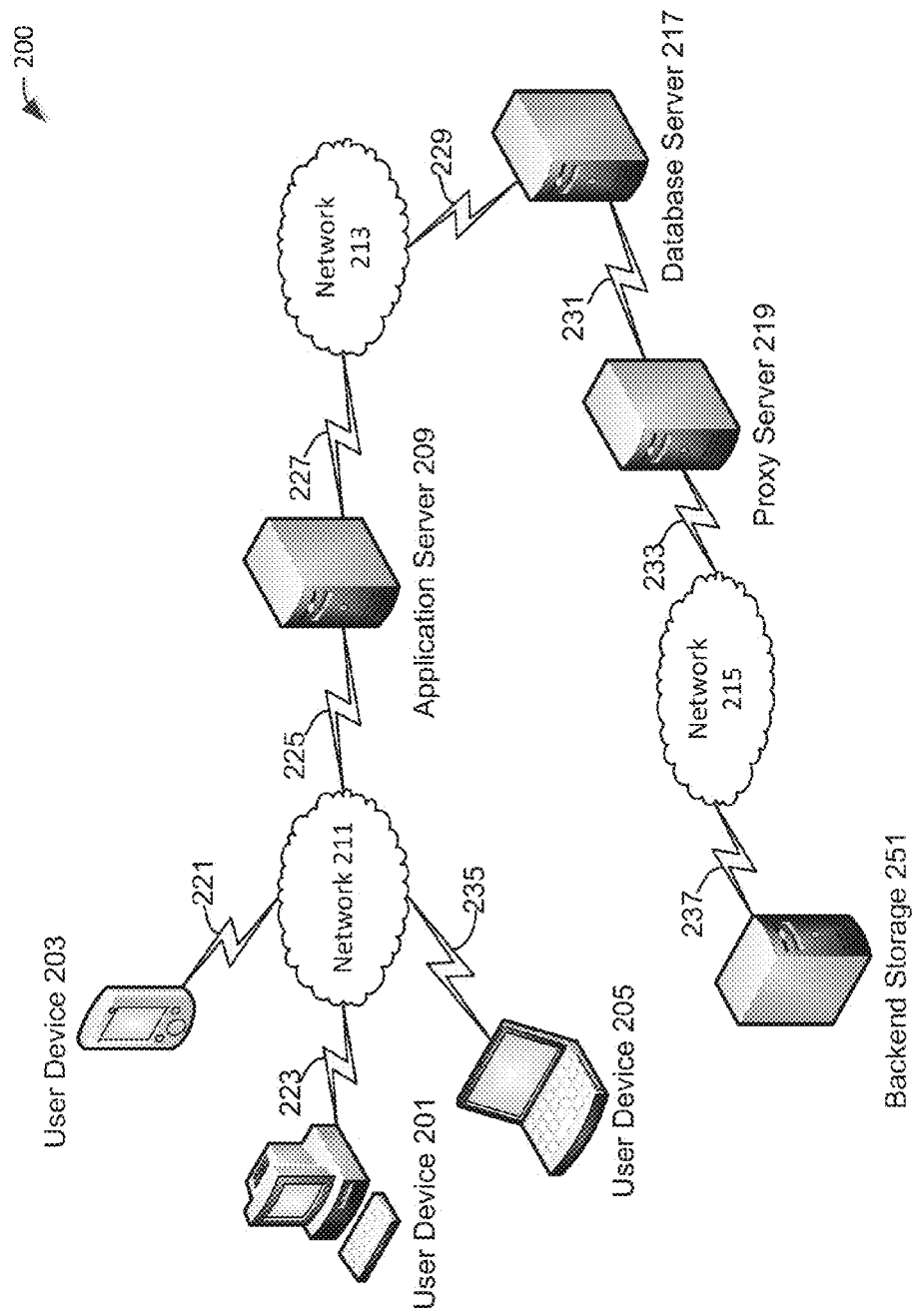
FIG. 2 depicts a network diagram illustrating an example network environment for requesting data from storage device, in accordance with one or more embodiments of the disclosure.

FIG. 2 depicts a network diagram illustrating an example network environment for requesting data from storage device, in accordance with one or more embodiments of the disclosure. While exemplary network environment 200 is directed to a network environment that may include one or more wired or wireless links, it is appreciated that network environment 200 can be any type of network that communicates using packets.

Network environment 200 may include one or more user devices (e.g., User Device 201, User Device 203, User Device 205), an application server (e.g., Application Server 209), a database server (e.g., Database Server 217), a proxy server (e.g., Proxy Server 219), a backend storage device (e.g., Backend Storage 251), and one or more networks (e.g., Networks 211, 213, and 215). One or more of the user devices may communicate with the application server using wireless links and/or wired links. For example, User Device 203 may communicate with Application Server 209 using a wireless connection (e.g., Connection 221) to connect to an access point (not shown), within Network 211, that may communicate with Application Server 209 using a wired connection (e.g., Connection 225), thereby establishing a communication link between User Device 203 and Application Server 209. As another example, User Device 201 may communicate with Application Server 209 using a wired and/or wireless connection (e.g., Connection 223) to connect to a router (not shown) and/or switch (not shown), within Network 211, that may communicate with Application Server 209 using a wired connection (e.g., Wired Connection 225), thereby establishing a communication link between User Device 201 and Application Server 209. As yet another example, User Device 205 may communicate with Application Server 209 using a wired and/or wireless connection (e.g., Connection 235) to connect to a router (not shown) and/or switch (not shown), within Network 211, that may communicate with Application Server 209 using a wired connection (e.g., Connection 225), thereby establishing a communication link between User Device 205 and Application Server 209. In some embodiments, the access point may and switch and/or router may be the same device and may route packets or switch frames between the user devices and the application server. Connection 221 may be implemented using one or more wireless communication standards. In some embodiments, any of the wireless personal area network protocols disclosed in the Wi-Fi Alliance standards, colloquially known as the Institute for Electrical and Electronics Engineers' (IEEE) 802.11 standards, may be used. For example, User Device 103 may connect to Network 111 using the IEEE 802.11 a, b, g, n, ac, ad, af, ah, ai, aj, aq, ax, and/or ay standards. In other embodiments, Connection 221 may be implemented using one or more cellular network standards as well. For example, User Device 203 may connect to Network 211 using Global System for Mobile Communication (GSM), Universal Mobile Telecommunication System (UMTS), Code Division Multiple Access (CDMA), CDMA 2000, and/or Long Term Evolution (LTE). In some embodiments, Connection 223 may be implemented using one or more of the same wireless communication standards used in implementing Connection 221. Connections 223, 225, and 235 may be implemented using one or more wired communication standards. For example, Connections 223, 225, 227, 229, 231, 233, and 237 may be implemented using any of the IEEE 802.1 or 802.3 standards. For instance, Connections 223, 225, and 235 may be implemented using an IEEE 802 Local Area Network (LAN) connection protocol, an IEEE 802 Metropolitan Area Network (MAN) connection protocol, or a Wide Area Network (WAN) connection protocol. Connections 223, 225, and 235 may be implemented using IEEE 802.1 B, D, E, F G, H, Q, X, AB, AC, AE, AR, AS, AX, BA, BR, and/or CB. In some embodiments, Connections 223, 225, 227, 229, 231, 233, and 235 may be implemented using one or more wireless broadband standards. For example, Connections 227 and 229 may be implemented using wireless broadband standard IEEE 802.16, colloquially referred to as Worldwide Interoperability for Microwave Access (WiMAX), and Connections 231 and 233 may be implemented using LTE, High Speed Packet Access (HSPA), or Enhanced Data Rates for GSM Evolution (EDGE).

Networks 211, 213, and 215 may include one or more routers and/or switches that forward or switch packets between two endpoints. For example, Network 213 may route packets and/or switch frames between Application Server 209 and Database Server 217 in either direction (i.e., from Application Server 209 to Database Server 217 and vice versa). In some embodiments, Networks 211, 213, and/or 215 may include one or more cellular masts to provide cellular connectivity between endpoints connected to Networks 211, 213, and 215. For example, User Device 203 may be a mobile computing device (e.g., cellular phone) that connects to one or more mobile telecommunication service provider networks by sending and receiving signals to cellular masts in Network 211 associated with the one or more mobile telecommunication service provider networks. In other embodiments, fixed wireless or wired point-to-point links may be used in Networks 211, 213, and/or 215.

Application Server 209 may be a device that can be represented by any electronic addressable format, and can exist as a standalone device, or may be one of several servers in a server farm. Application Server 209 may be a physical and/or virtual server. In some embodiments, Application Server 209 may include a hardware layer, an operating system, and a hypervisor creating or managing one or more virtual machines. Application Server 209 may provide one or more services to one or more user devices. These services may include providing one or more applications to one or more user devices (e.g., User Devices 201, 203, and/or 205). The applications may include, for example, Structured Query Language (SQL) applications. For example, one or more SQL applications may include any application that uses a database. For instance, a customer relationship management (CRM) system, contacts database, company Intranet system, financial services trading application platforms, or reporting applications may be executed on one or more processors using one or more SQL statements. Application Server 209 may send requests/queries to Database Server 217 for data stored either on Proxy Server 217 or Backend Storage 251 using Network 213. For example, Application Server 209 may receive a request from User Device 205 for data about one or more sales transactions within a month of sales transactions not inclusive of the entire month of sales transactions. For instance, an application executing on User Device 205 may audit the number of sales transactions within a given month wherein the total amount of money received by a business exceeds a certain threshold. Application Server 209 may send a request to Database Server 217 to retrieve the data that may be locally stored on Proxy Server 219 or stored in a backend storage device (e.g., Backend Storage 251).

Database Server 217 may be a server storing one or more computer-executable instructions or instruction sets in one or more memories that enables the server to provide access to a database stored in computer-readable media in the server to one or more user devices that may connect to the server. The one or more computer-executable instructions or instruction sets may be referred to as a Database Management System (DBMS). In some embodiments, the DBMS may be an open-source RDBMS such as MySQL. The one or more instructions or instruction sets may include one or more query languages. There may be one or more processors on the server that may receive a query from a user device for data, and may convert the query to a format that is compatible with the one or more computer-executable instructions or instruction sets executed by the one or more processors to retrieve data relevant to the request of the user device. In some embodiments, the data requested by the user device may be stored in computer-readable media that may be in the server. For example, there may be one or more hard drives/disks accessible by the one or more processors via a system bus connecting the processor to the one or more hard drives/disks. In some embodiments, the computer-readable media may be one or more physical and/or virtual hard drives/disks. In some embodiments, the one or more physical and/or virtual hard disks may be a part of a storage array such as Network Area Storage (NAS) device or they may be a part of one or more distributed storage devices that are accessible to the server via a network connection (e.g., Network 215). The storage array or distributed storage devices may be referred to as backend storage. In some embodiments, the one or more computer-executable instructions may cause the processor to send a request to one or more processors in the backend storage to read data from the one or more hard disks in response to a request from a user device to retrieve/fetch data from the one or more hard disks. In other embodiments, the one or more computer-executable instructions may cause the processor to a request to the one or more processors in the backend storage to write data to the one or more hard disks in response to a request from the user device to store data on the one or more hard disks.

In some embodiments, Proxy Server 219 may be used in a network environment in which Backend Storage 251 does not provide a capability to respond to queries for data corresponding to a request from a user device. That is, in some embodiments Backend Storage 251 may not include the hardware (e.g., processors, disk controllers, or memory) or instructions/instruction sets necessary to read data from computer-readable media (e.g., hard drives/disks) storing the data corresponding to the queries for the data from the user device. As a result, a memory in Proxy Server 219 may store one or more instructions or instruction sets that may cause a processor in Proxy Server 219 to send a request to Backend Storage 251 for the data requested by the user device, and return the requested data to the user device via Database Server 217 and Application Server 209. Database Server 217 may be communicatively coupled to Proxy Server 219 via an Ethernet network connection or some other high throughput data transfer connection. For instance, Database Server 217 may be connected to Proxy Server 219 via a LAN. In some embodiments, Database Server 217 and Proxy Server 219 may be physically collocated in a single standalone data center. In other embodiments, Database Server 217 and Proxy Server 219 may be in two different data centers, but may still be on the same LAN via a Virtual Private Network (VPN) connection created over a LAN or WAN connection to a different data center or the Cloud.

Proxy Server 219 may be used in embodiments in which a backend storage device is unable to store instructions or instructions sets like Backend Storage 119 to send requested data back to a database server. That is, if the backend storage device is unable to execute the instructions or instruction sets to read data corresponding to the requested data and send it back to the database server a proxy server may be communicatively coupled to the database server and the backend storage device. Thus, in some embodiments, a proxy server may be used to interface with a backend storage device that is incapable of executing the instructions or instruction sets to read the data and filtering it in the storage device before sending it back to the database server in order to request the data from the backend storage device and return the requested data to the database server.

Backend Storage 251 may include one or more computer-readable media storing data and one or more processors that may read and/or write the data from or to the one or more computer-readable media. The one or more processors may receive a request from one or more processors in a Proxy Server 219 to read data from the one or more computer-readable media in Backend Storage 251 corresponding to a request transmitted to Database Server 217 from Application Server 209. The request may correspond to an application executing on Application Server 209, and hosted for a user device (e.g., User Device 101). Backend Storage 251 may be a NAS device or a distributed storage device. Even though Backend Storage 251 is depicted by a single device, it is not limited to a single device. For example, Backend Storage 251 may be a distributed storage device that manages a file system spanning a plurality of server racks distributed throughout the world. For instance, returning to the example above in which a user device (e.g., User Device 205) requests sales data from a backend storage device, the backend storage device may be a file system wherein the files in the file system are distributed across a plurality of hard disks belonging to server racks on different continents. As a result, the backend storage device, storing the data requested by the user device, may not be on the same continent as user device requesting the data.

Figure 3:
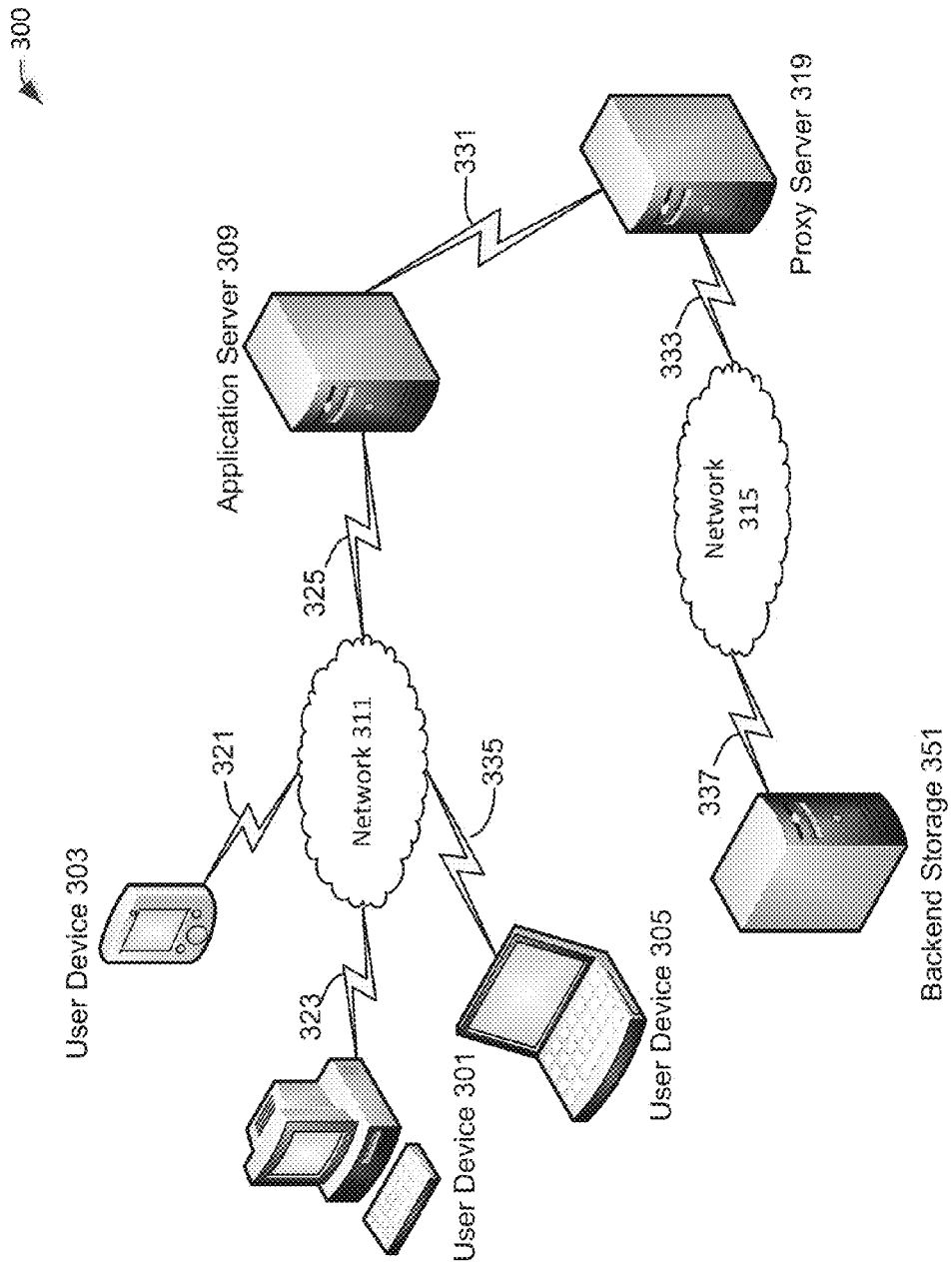
FIG. 3 depicts a network diagram illustrating an example network environment for requesting data from storage device, in accordance with one or more embodiments of the disclosure.

FIG. 3 depicts a network diagram illustrating an example network environment for requesting data from storage device, in accordance with one or more embodiments of the disclosure. While exemplary network environment 300 is directed to a network environment that may include one or more wired or wireless links, it is appreciated that network environment 300 can be any type of network that communicates using packets.

Network environment 300 may include one or more user devices (e.g., User Device 301, User Device 303, User Device 305), an application server (e.g., Application Server 309), a proxy server (e.g., Proxy Server 319), a backend storage device (e.g., Backend Storage 311), and one or more networks (e.g., Networks 311 and 315). One or more of the user devices may communicate with the application server using wireless links and/or wired links. For example, User Device 303 may communicate with Application Server 309 using a wireless connection (e.g., Connection 321) to connect to an access point (not shown), within Network 311, that may communicate with Application Server 309 using a wired connection (e.g., Connection 325), thereby establishing a communication link between User Device 303 and Application Server 309. As another example, User Device 301 may communicate with Application Server 309 using a wired and/or wireless connection (e.g., Connection 323) to connect to a router (not shown) and/or switch (not shown), within Network 311, that may communicate with Application Server 309 using a wired connection (e.g., Wired Connection 325), thereby establishing a communication link between User Device 301 and Application Server 309. As yet another example, User Device 305 may communicate with Application Server 309 using a wired and/or wireless connection (e.g., Connection 335) to connect to a router (not shown) and/or switch (not shown), within Network 311, that may communicate with Application Server 309 using a wired connection (e.g., Connection 325), thereby establishing a communication link between User Device 305 and Application Server 309. In some embodiments, the access point may and switch and/or router may be the same device and may route packets or switch frames between the user devices and the application server. Connection 321 may be implemented using one or more wireless communication standards. In some embodiments, any of the wireless personal area network protocols disclosed in the Wi-Fi Alliance standards, colloquially known as the Institute for Electrical and Electronics Engineers' (IEEE) 802.11 standards, may be used. For example, User Device 303 may connect to Network 111 using the IEEE 802.11 a, b, g, n, ac, ad, af, ah, ai, aj, aq, ax, and/or ay standards. In other embodiments, Connection 321 may be implemented using one or more cellular network standards as well. For example, User Device 303 may connect to Network 311 using Global System for Mobile Communication (GSM), Universal Mobile Telecommunication System (UMTS), Code Division Multiple Access (CDMA), CDMA 2000, and/or Long Term Evolution (LTE). In some embodiments, Connection 323 may be implemented using one or more of the same wireless communication standards used in implementing Connection 321. Connections 323, 325, and 335 may be implemented using one or more wired communication standards. For example, Connections 323, 325, 331, 333, and 337 may be implemented using any of the IEEE 802.1 or 802.3 standards. For instance, Connections 323, 325, and 335 may be implemented using an IEEE 802 Local Area Network (LAN) connection protocol, an IEEE 802 Metropolitan Area Network (MAN) connection protocol, or a Wide Area Network (WAN) connection protocol. Connections 323, 325, and 335 may be implemented using IEEE 802.1 B, D, E, F G, H, Q, X, AB, AC, AE, AR, AS, AX, BA, BR, and/or CB. In some embodiments, Connections 323, 325, 333, and 335 may be implemented using one or more wireless broadband standards. For example, Connections 325 and 333 may be implemented using wireless broadband standard IEEE 802.16, colloquially referred to as Worldwide Interoperability for Microwave Access (WiMAX), and Connection 331 may be implemented using LTE, High Speed Packet Access (HSPA), or Enhanced Data Rates for GSM Evolution (EDGE).

Networks 311 and 315 may include one or more routers and/or switches that forward or switch packets between two endpoints. For example, Network 315 may route packets and/or switch frames between Proxy Server 319 and Backend Storage 311 in either direction (i.e., from Proxy Server 319 to Backend Storage 311 and vice versa). In some embodiments, Networks 311 and/or 315 may include one or more cellular masts to provide cellular connectivity between endpoints connected to Networks 311 and/or 315. For example, User Device 303 may be a mobile computing device (e.g., cellular phone) that connects to one or more mobile telecommunication service provider networks by sending and receiving signals to cellular masts in Network 311 associated with the one or more mobile telecommunication service provider networks. In other embodiments, fixed wireless or wired point-to-point links may be used in Networks 311 and/or 315.

Application Server 309 may be a device that can be represented by any electronic addressable format, and can exist as a standalone device, or may be one of several servers in a server farm. Application Server 309 may be a physical and/or virtual server. In some embodiments, Application Server 309 may include a hardware layer, an operating system, and a hypervisor creating or managing one or more virtual machines. Application Server 309 may provide one or more services to one or more user devices. These services may include providing one or more applications to one or more user devices (e.g., User Devices 301, 303, and/or 305). The applications may include, for example, Structured Query Language (SQL) applications or Extract-Transform-Load (ETL) applications that read and process structured, semi-structured, and/or unstructured files. In some embodiments, the applications may include data APIs such as REST services, data analysis tools for analytics, reporting applications, document retrieval systems, etc. In some embodiments, Application Server 309 may send requests/queries to Proxy Server 319 for data stored on Proxy Server 319 using Connection 331. In other embodiments, Application Server 309 may send file read requests or queries to Backend Storage 351 by way of Proxy Server 319 and Network 315. For example, Application Server 309 may receive a request from User Device 305 for data about one or more sales transactions within a month of sales transactions not inclusive of the entire month of sales transactions. For instance, an application executing on User Device 305 may audit the number of sales transactions within a given month wherein the total amount of money received by a business exceeds a certain threshold. Application Server 309 may send a request to Proxy Server 319 to retrieve the data that may be locally stored on Proxy Server 319 or stored in a backend storage device (e.g., Backend Storage 351).

Proxy Server 319 may be a server storing one or more computer-executable instructions or instruction sets in one or more memories that enables the server to provide access to a database stored in computer-readable media in the server to one or more user devices that may connect to the server. The one or more computer-executable instructions or instruction sets may be referred to as a Database Management System (DBMS). In some embodiments, the DBMS may be an open-source RDBMS such as MySQL. The one or more instructions or instruction sets may include one or more query languages. There may be one or more processors on the server that may receive a query from a user device for data, and may convert the query to a format that is compatible with the one or more computer-executable instructions or instruction sets executed by the one or more processors to retrieve data relevant to the request of the user device. In some embodiments, the data requested by the user device may be stored in computer-readable media that may be in the server. For example, there may be one or more hard drives/disks accessible by the one or more processors via a system bus connecting the processor to the one or more hard drives/disks. In some embodiments, the computer-readable media may be one or more physical and/or virtual hard drives/disks. In some embodiments, the one or more physical and/or virtual hard disks may be a part of a storage array such as Network Area Storage (NAS) device or they may be a part of one or more distributed storage devices that are accessible to the server via a network connection (e.g., Network 315). The storage array or distributed storage devices may be referred to as backend storage. In some embodiments, the one or more computer-executable instructions may cause the processor to send a request to one or more processors in the backend storage to read data from the one or more hard disks in response to a request from a user device to retrieve/fetch data from the one or more hard disks and optionally filter retrieved data in the server and return only relevant data back to the application server or user device. In other embodiments, the one or more computer-executable instructions may cause the processor to a request to the one or more processors in the backend storage to write data to the one or more hard disks in response to a request from the user device to store data on the one or more hard disks.

In some embodiments, Proxy Server 319 may be used in a network environment in which Backend Storage 351 does not provide a capability to respond to queries for data corresponding to a request from a user device. That is, in some embodiments Backend Storage 351 may not include the hardware (e.g., processors, disk controllers, or memory) or instructions/instruction sets necessary to read data from computer-readable media (e.g., hard drives/disks) storing the data corresponding to the queries for the data from the user device. As a result, a memory in Proxy Server 319 may store one or more instructions or instruction sets that may cause a processor in Proxy Server 319 to send a request to Backend Storage 351 for the data requested by the user device, and return the requested data to the user device via Application Server 309.

Backend Storage 351 may include one or more computer-readable media storing data and one or more processors that may read and/or write the data from or to the one or more computer-readable media. The one or more processors may receive a request from one or more processors in a Proxy Server 319 to read data from the one or more computer-readable media in Backend Storage 351 corresponding to a request transmitted to Proxy Server 319 from Application Server 309. The request may correspond to an application executing on Application Server 309, and hosted for a user device (e.g., User Device 301). Backend Storage 351 may be a NAS device or a distributed storage device. Even though Backend Storage 351 is depicted by a single device, it is not limited to a single device. For example, Backend Storage 351 may be a distributed storage device that manages a file system spanning a plurality of server racks distributed throughout the world. For instance, returning to the example above in which a user device (e.g., User Device 305) requests sales data from a backend storage device, the backend storage device may be a file system wherein the files in the file system are distributed across a plurality of hard disks belonging to server racks on different continents. As a result, the backend storage device, storing the data requested by the user device, may not be on the same continent as user device requesting the data.

Figure 4:
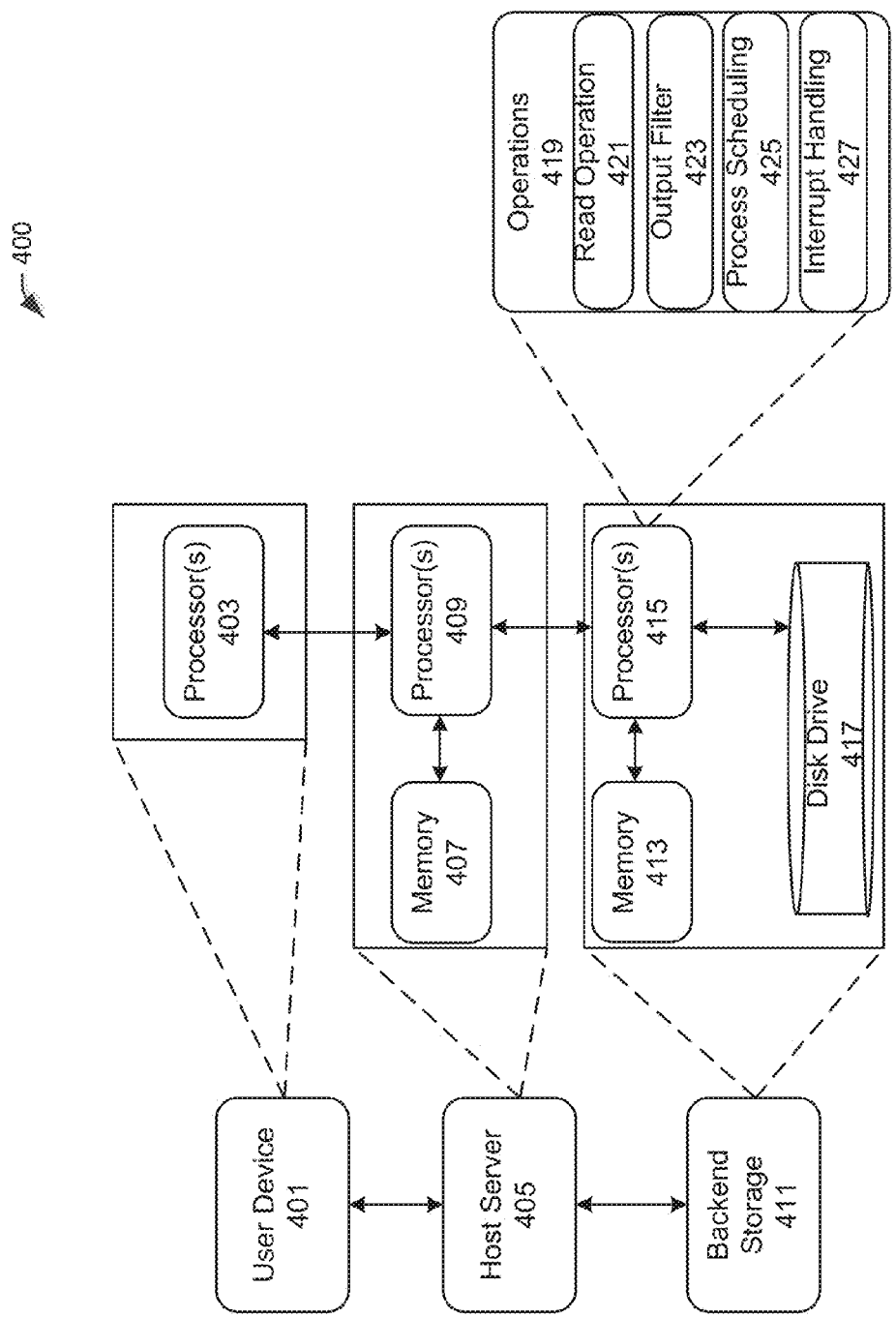
FIG. 4 is a schematic block diagram depicting intercommunication connections between one or more components of an illustrative user device, server device, and storage device in accordance with one or more embodiments of the disclosure.

FIG. 4 is a schematic block diagram depicting intercommunication connections between one or more components of an illustrative user device, server device, and storage device in accordance with one or more embodiments of the disclosure.

Logical intercommunication connections 400 may include logical connections between one or more processors in a user device requesting access to one or more applications that may be executed by one or more processors in a host server hosting the one or more applications. Logical intercommunication connections 400 may include logical connections between one or more processors on the host server requesting access to data stored in one or more computer-readable media stored on a storage device. The user device (e.g., User Device 401) may include, among other electrical components, one or more processors (e.g., Processor(s) 403) that may be communicatively connected to one or more processors (e.g., Processor(s) 409) in the host server (e.g., Host Server 405) via one or more data networks. The host server may include a memory (e.g., Memory 407) that may store one or more computer-executable instructions and/or instruction sets that may be executed by the one or more processors in the host server. In some embodiments, the one or more computer-executable instructions and/or instruction sets may be caused to be executed by the one or more processors in the host server in response to the one or more processors in the user device. For example, Processor(s) 403 may send a data communication signal (e.g., Internet Protocol packet) to Processor(s) 409 including one or more computer-executable instructions causing Processor(s) 409 to execute one or more computer-executable instructions in Memory 407 that cause Processor(s) 409 to read data stored on one or more computer-readable media. The data read from the one or more computer-readable media may be used by Processor(s) 409 to execute the one or more computer-executable instructions and/or instruction sets. The execution of the one or more computer-executable instructions and/or instruction sets may correspond to an application hosted on Host Server 405 to one or more user devices (e.g., User Device 401). For example, Host Server 405 may host an application including one or more computer-executable instructions which when executed by Processor(s) 409, in response to Processor(s) 403 sending a signal to Processor(s) 409, cause Processor(s) 409 to send a signal to Processor(s) 403 causing Processor(s) 403 to send a signal to a display on User Device 401 to display the application being executed by Processor(s) 409. For instance, User Device 401 may request access to an application executing on Processor(s) 409 that may provide access to data relevant to one or more sales transactions within a month of sales transactions not inclusive of the entire month of sales transactions. The application may create an audit data of the number of sales transactions within a given month wherein the total amount of money received by a business exceeds a certain threshold. Thus, Processor(s) 409 may send a signal to Processor(s) 403 including the audit data, and Processor(s) 403 may display the data on a display. In some embodiments, User Device 401 may include one or more first computer-executable instructions stored in a memory that may cause Processor(s) 403 to determine, compute, and/or calculate data using the audit data. In some embodiments, Processor(s) 403 may determine statistical trends in the audit data. For example, Processor(s) 403 may determine that the audit data exhibits and/or contains perennial characteristics corresponding to changes in seasons. For instance, the audit data may contain sales of a natural gas business that exceed a certain threshold during summer months. The sales may increase during the summer months because the demand for natural gas during summer months may increase to support the increase in demand for air conditioners powered by natural gas generators. As such, Processor(s) 403 may execute computer-executable instructions stored in a memory in User Device 401 to determine, compute, and/or calculate one or more moving averages on the audit data (e.g., an autoregressive integrated moving average).

Logical intercommunication connections 400 may also include a connection between a host server that hosts applications that may be accessed by one or more user devices, and a storage device storing data relevant and/or necessary for the applications to execute. As an example, Host Server 405 may communicate with Backend Storage 411 via a logical intercommunication connection between Processor(s) 409 and Processor(s) 415 and request data stored on one or more computer-readable media (e.g., Disk Drive 417). In particular, one or more computer-executable instructions and/or instruction sets may be executed by Processor(s) 409, in response to receiving a signal from Processor(s) 403 requesting access to an application hosted by Host Server 405, that may cause Processor(s) 409 to send a signal to Processor(s) 415 to execute one or more computer-executable instructions and/or instruction sets stored in Memory 413 to cause Processor(s) 415 to read data from Disk Drive 417 that may be relevant to the execution of the application by Processor(s) 409. The storage device (e.g., Backend Storage 411) may store in a memory (e.g., Memory 413) one or more computer-executable instructions that may cause Processor(s) 415 to execute one or more computer-executable operations (e.g., Operations 419). The one or more computer-executable operations may include a read operation wherein Processor(s) 415 may send one or more signals to a disk controller (not shown) that may control access to one or more computer-readable media (e.g., one or more disk drives). In particular, Processor(s) 415 may send one or more signals to the one or more disk controllers that may cause one or more read/write heads to transform electromagnetic signals to electrical signals to read data from a platter in the disk drive or transform electrical signals to electromagnetic signals to write data to the platter. Thus, Processor(s) 415 may execute Read Operation 421 by sending a signal to the disk controller that may cause the disk controller to move the read/write heads to a location on the platter associated with data that may be requested by Processor(s) 409 for an application being executed by Processor(s) 409. The read/write heads may transform one or more electromagnetic signals corresponding to the requested data on the platter to electrical signals, and may send the electrical signals to Processor(s) 415 which may in turn send a signal to Processor(s) 409 including the requested data. Processor(s) 415 may also send one or more signals to the disk controller to write (i.e., transform one or more electrical signals to electromagnetic signals) data to the platter.

Processor(s) 415 may also execute one or more first computer-executable instructions stored in Memory 413 to schedule an order in which one or more processes may be executed by Processor(s) 415. This may be referred to as process scheduling (e.g., Process Scheduling 425). The one or more processes may correspond to one or more second computer-executable instructions or may correspond to one more signals that may be received from another processor (e.g., Processor(s) 403 and/or Processor(s) 415). For example, the one or more first computer-executable instructions may cause Processor(s) 415 to assign a higher priority to a process corresponding to processing a second request, received from Processor(s) 403, for data stored on Backend Storage 411, and more particularly for data stored on Disk Drive 417, than a process corresponding to processing a signal, received from Processor(s) 415, including data corresponding to a first request received from Processor(s) 409 for the data. As a result Processor(s) 415 may process the second request first and process the signal second. Processor(s) 415 may process the processes in this order to send the requesting processor (i.e., Processor(s) 409 in this example) the data corresponding to the first and second requests in one signal, thereby reducing the amount of signaling needed to send data intended for the same processor. In some embodiments, Processor(s) 415 may execute processes corresponding to sending the data to Processor(s) 409 in the same order in which the requests for data are received. In other embodiments, Processor(s) 415 may execute processes based at least in part on a priority assigned to a request received from a processor (e.g., Processor(s) 409). For example, Process Scheduling 425 may cause Processor(s) 415 to assign a first priority to a first request for data based at least in part on a first priority indication in a first signal corresponding to the first request and may assign a second priority to a second request for data based at least in part on a second priority indication in a second signal corresponding to the second request wherein the first priority is higher than the second priority. As a result if the first signal arrives at Processor(s) 415 after the second signal arrives, Processor(s) 415 may process the first signal before it processes the second signal and may send a first signal to the disk controller in Disk Drive 417 to read data corresponding to the first request first, and then may send a second signal to the disk controller to read data corresponding to the second request after the first signal has been sent.

Processor(s) 415 may also perform one or more interrupt handling operations (e.g., Interrupt Handling 427). In some embodiments, Processor(s) 415 may include one or more electrical pins that may be electrically connected to other components in Backend Storage 411 such as Memory 413 and Disk Drive 417, and may receive one or more electrical signals from these components to cause Processor(s) 415 to stop executing a process corresponding to one or more computer-executable instructions or instruction sets and may cause Processor(s) 415 to execute one or more other computer-executable instructions corresponding to the one or more electrical signals. Upon receiving the one or more electrical signals which may include one or more computer-executable instructions, Processor(s) 415 may store the one or more computer-executable instructions in Memory 413, save a state of the stopped process, then execute the one or more computer-executable instructions stored in Memory 413. This type of electrical signal may be referred to as an interrupt. The one or more interrupt handling operations (e.g., Interrupt Handling 427) may be one or more computer-executable instructions that may cause Processor(s) 415 to process the interrupt. For example, Interrupt Handling 427 may cause Processor(s) 415 to send an electrical signal to a disk controller to read data from a platter in Disk Drive 417 in response to an interrupt (e.g., a request for the data) that may be received from Processor(s) 409 to read the data stored on the platter. If Processor(s) 415 are executing one or more first computer-executable instructions and/or instruction sets when the interrupt is received, Processor(s) 415 may stop executing the one or more first computer-executable instructions and/or instruction sets and may execute one or more second computer-executable instructions and/or instruction sets to process the interrupt.

Processor(s) 415 may perform a filtering operation that may filter data read from one or more of Disk Drive 417 before it may be sent to Processor(s) 409 in response to a request for data from one or more of Disk Drive 417. In some embodiments, Processor(s) 415 may use the operations in Operations 419 to filter the data. In other embodiments, Processor(s) 415 may use one or more other operations not included in Operations 419 to filter the data. Yet in other embodiments, Processor(s) 415 may use a combination of the operations in Operations 419 and the one or more operations not included in Operations 419. The filtering may correspond to one or more computer-executable instructions stored in Memory 413 that may cause Processor(s) 415 to filter data received in response to a request for data from one more of Disk Drive 417, as explained above, and may further cause Processor(s) 415 to send the filtered data to an intended destination device (e.g., Processor(s) 409). In particular, Memory 413 may store one or more computer-executable instructions which when executed by Processor(s) 415 may cause Processor(s) 415 to send an electrical signal on a bus to Processor(s) 409 to request Processor(s) 409 to read Memory 407 to determine a relevancy context data associated with a request that Processor(s) 415 may receive from Processor(s) 409. In some embodiments, the relevancy context data may include information about where the data may be stored in one or more computer-readable media. For example, Disk Drive 417 may include a plurality of computer-readable media (e.g., several hundred disk drives), and the relevancy context data may include one or more instructions or instruction sets which when executed by Processor(s) 415 may cause Processor(s) 415 to identify the disk drive(s) storing the data. The relevancy context data may also include one or more other instructions or instruction sets that may cause Processor(s) 415 to send an electrical signal to one or more read/write heads in Disk Drive 417 that may cause the one or more read/write heads to read the data from a location on a platter in Disk Drive 417. More specifically, the electrical signal may cause the one or more read/write heads to be moved to a location on the platter including the data stored in one or more electromagnetic fields, and may cause the one or more read/write heads to convert the electromagnetic signals corresponding to the data into electrical signals that may be sent to Processor(s) 415. Processor(s) 415 may then send a signal including the data to the requesting processor (e.g., Processor(s) 409). In some embodiments, the data may be stored on a plurality of computer-readable media (e.g., disk drives) within Disk Drive 417 and the relevancy context data may include one or more computer-executable instructions which when executed by Processor(s) 415 may cause Processor(s) 415 to send an electrical signal to a disk controller in each of the plurality of disk controllers that may cause a read/write head in the disk controllers to be moved to a location on a platter in each of the disk controllers wherein the requested data is stored. The read/write heads may convert an electromagnetic signal storing the requested data into an electrical signal that may be sent to Processor(s) 415 which may in turn send an electrical signal including the requested data to the requesting processor(s) (e.g., Processor(s) 409). As an example, Processor(s) 415 may receive a request for a portion of sales data for one or more sales transactions within a month of sales transactions not inclusive of the entire month of sales transactions. For instance, an application executing on User Device 401 may audit the number of sales transactions within a given month wherein the total amount of money received by a business exceeds a certain threshold. Data corresponding to the entire month of sales transactions may be stored on a plurality of disks in Disk Drive 417, and Processor(s) 409 may receive a request from Processor(s) 403 for data corresponding to sales transactions within a given month wherein the total amount of money received by the business exceeds a threshold, but is not inclusive of all sales transactions for the month. In other words, Processor(s) 403 may request a subset of all sales data for the entire month. Memory 407 may store computer-executable instructions that may cause a processor to locate a subset of data corresponding to the sales transactions within the given month wherein the total amount of money received by the business exceeds the threshold. The computer-executable instructions may have been stored in Memory 407 based on a previous request for the same subset of data, or it may be based at least in part on another subset of data that may indicate how data and where one or more subsets of data are stored on the disk drives. The one or more computer-executable instructions that may cause Processor(s) 415 to read and send the subset of data to Processor(s) 409 may be referred to as an output filter operation (e.g., Output Filter 423). Accordingly, Output Filter 423 may be implemented when Processor(s) 415 execute the one or more computer-executable instructions to read subsets of data stored on one or more disk drives in for example Disk Drive 417.

In some embodiments, User Device 401, or more particularly Processor(s) 403 may execute one or more computer-executable instructions corresponding to an application, hosted on Host Server 405 that may cause Processor(s) 409 to request data from Backend Storage 411 using a specific instruction set. For example, Processor(s) 403 may execute one or more computer-executable instructions corresponding to an application command including one or more computer-executable instructions which may cause Processor(s) 409 to request data from Backend Storage 411. The one or more computer-executable instructions may be based at least in part on a RDBMS or a relational data stream management system (RDSMS) instruction set or operating system file input/output (I/O) instruction set. In some embodiments the RDBMS or RDSMS instruction set may be a SQL instruction set. Processor(s) 409 may store the one or more computer-executable instructions corresponding to the application command in Memory 407 after receiving the one or more computer-executable instructions. Processor(s) 409 may execute the SQL instruction set or file I/O instruction set, thereby causing Processor(s) 409 to send a request to Processor(s) 415 for data based at least in part on the command executed by Processor(s) 403. The request may be a first SQL query or a first data request from a file. Processor(s) 415 may receive the first SQL query or file I/O request for the requested data and may send an information request back to Processor(s) 409 via an API call for relevancy context data which may be data read from Memory 407 by Processor(s) 409. The requested data may be stored in Disk Drive 417 in a table format, wherein the table includes rows and columns that may be stored as a heap file, heap table, B+ tree. In some embodiments, the data in the table may be stored using row-oriented storage, wherein all data associated with a given row is stored in the same storage location. In other embodiments, the data in the table may be stored using a column-oriented storage, wherein all data associated with a given column is stored in the same storage location. As an example, the relevancy context data may indicate which rows, columns, and/or predicates (e.g., relational operators including equal to, not between, greater than, greater than or equal to, less than, less than or equal to, IN, BETWEEN, LIKE, IS NULL, IS NOT NULL) may have been included in the command Thus, Processor(s) 409 may determine the relevancy context, for example that the requested data corresponding to the command corresponds to one or more rows and/or one or more columns and one or more predicates applied to the one or more rows and one or more columns. For example, the command may correspond to a request for data in the second row and twenty-ninth through thirty-fifth columns, thirtieth through forty-first rows and sixty-ninth through seventy-fifth columns, and a twenty-ninth through fortieth rows and first column wherein the elements (intersection of a column and row) satisfy one or more predicate relationships (e.g., each element is greater than a first value but between two values both of which are strictly greater than the first value). Accordingly, the relevancy context stored in Memory 407 may determine the elements stored in the table in Disk Drive 417. Processor(s) 409 may send a third SQL query to Processor(s) 415 in response to the second SQL query received from Processor(s) 415 including the relevancy context data. Processor(s) 415 may execute one or more computer-executable instructions that may cause Processor(s) 415 to send an electric signal to a disk controller that may retrieve the entire table or a portion of the table including the requested data from one or more computer-readable media in Disk Drive 417. Processor(s) 415 may receive one or more signals from the disk controller including the requested data, and may execute one or more computer-executable instructions that may cause Processor(s) 415 to execute Output Filter 423 which will cause Processor(s) 415 to store only the data from the table or portion of the table relevant to the requested data. Processor(s) 415 may execute computer-executable instructions corresponding to the received relevancy context data stored in Memory 413 while executing Output Filter 423 which will cause Processor(s) 415 to store only the data relevant to the request. Processor(s) 415 may then execute one or more computer-executable instructions that causing Processor(s) 415 to send the data stored in Memory 413 to Processor(s) 409.

Processor(s) 415 may filter the rows of the table relevant to the requested data by executing one or more first computer-executable instructions corresponding to a row filtering operation in Output Filter 423 based on one or more second computer-executable instructions corresponding to the relevancy context data. This may be referred to as slicing data in the table horizontally. Processor(s) 415 may filter the columns of the table relevant to the requested data by executing one or more third computer-executable instructions corresponding to a column filtering operation in Output Filter 423 based on one or more fourth computer-executable instructions corresponding to the relevancy context data.

Figure 5:
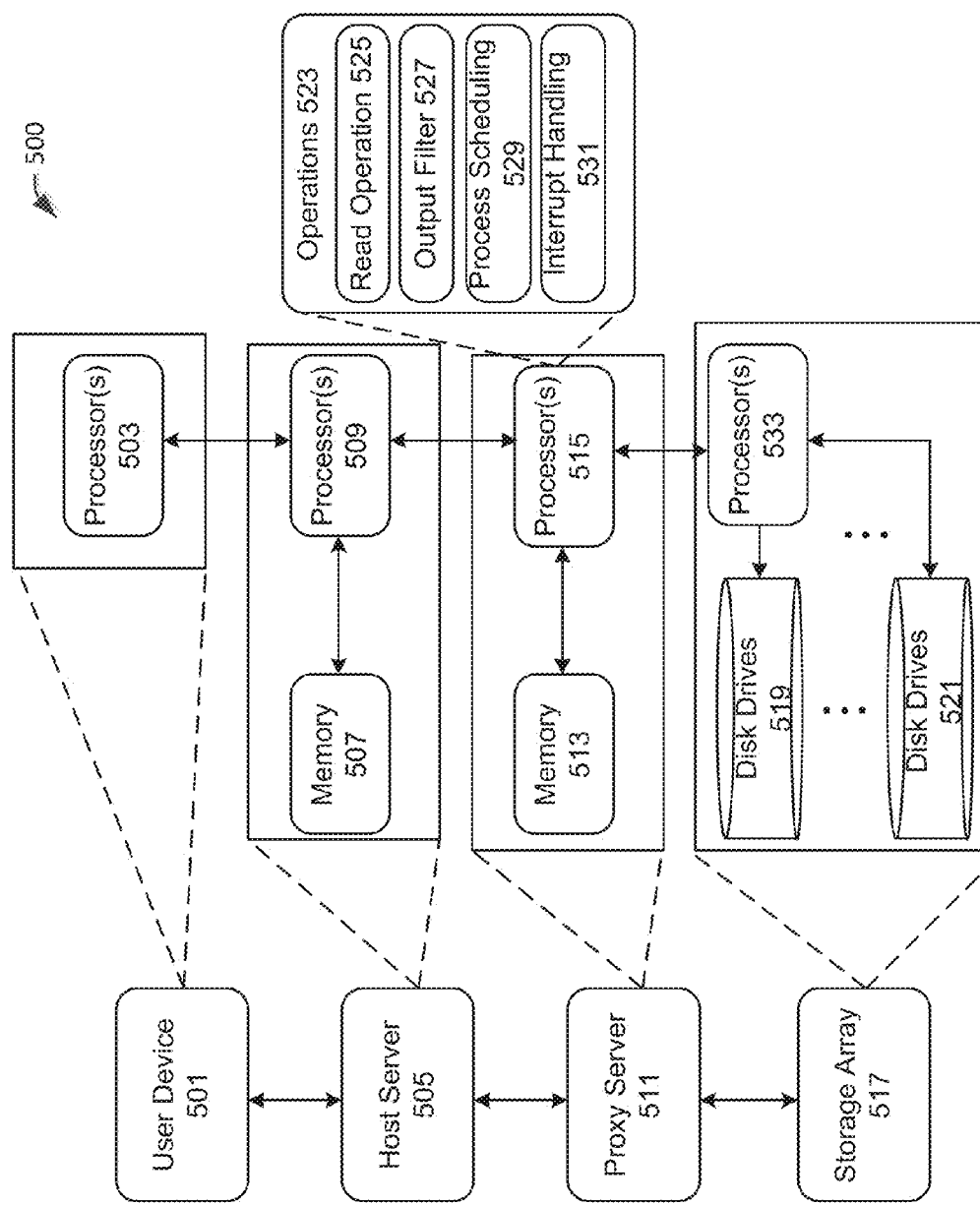
FIG. 5 is a schematic block diagram depicting intercommunication connections between one or more components of an illustrative user device, server devices, and storage device in accordance with one or more embodiments of the disclosure.

FIG. 5 is a schematic block diagram depicting intercommunication connections between one or more components of an illustrative user device, server devices, and storage device in accordance with one or more embodiments of the disclosure.

Logical intercommunication connections 500 may include logical connections between one or more processors in a user device requesting access to one or more applications that may be executed by one or more processors in a host server hosting the one or more applications. Logical intercommunication connections 500 may include logical connections between one or more processors on the host server requesting access to data stored in one or more computer-readable media stored on a storage device. The user device (e.g., User Device 501) may include, among other electrical components, one or more processors (e.g., Processor(s) 503) that may be communicatively connected to one or more processors (e.g., Processor(s) 509) in the host server (e.g., Host Server 505) via one or more data networks. The host server may include a memory (e.g., Memory 507) that may store one or more computer-executable instructions and/or instruction sets that may be executed by the one or more processors in the host server. In some embodiments, the one or more computer-executable instructions and/or instruction sets may be executed by the one or more processors in the host server in response to the one or more processors in the user device. For example, Processor(s) 503 may send a data communication signal (e.g., Internet Protocol packet) to Processor(s) 509 including one or more computer-executable instructions causing Processor(s) 509 to execute one or more computer-executable instructions in Memory 507 that cause Processor(s) 509 to read data stored on one or more computer-readable media. The data read from the one or more computer-readable media may be used by Processor(s) 509 to execute the one or more computer-executable instructions and/or instruction sets. The execution of the one or more computer-executable instructions and/or instruction sets may correspond to an application hosted on Host Server 505 to one or more user devices (e.g., User Device 501). For example, Host Server 505 may host an application including one or more computer-executable instructions which when executed by Processor(s) 509, in response to Processor(s) 503 sending a signal to Processor(s) 509, cause Processor(s) 509 to send a signal to Processor(s) 503 causing Processor(s) 503 to send a signal to a display on User Device 501 to display the application being executed by Processor(s) 509. For instance, User Device 501 may request access to an application executing on Processor(s) 509 that may provide access to data relevant to one or more sales transactions within a month of sales transactions not inclusive of the entire month of sales transactions. The application may create an audit data of the number of sales transactions within a given month wherein the total amount of money received by a business exceeds a certain threshold. Thus, Processor(s) 509 may send a signal to Processor(s) 503 including the audit data, and Processor(s) 503 may display the data on a display. In some embodiments, User Device 501 may include one or more first computer-executable instructions stored in a memory that may cause Processor(s) 503 to determine, compute, and/or calculate data using the audit data. In some embodiments, Processor(s) 503 may determine statistical trends in the audit data. For example, Processor(s) 503 may determine that the audit data exhibits and/or contains perennial characteristics corresponding to changes in seasons. For instance, the audit data may contain sales of a natural gas business that exceed a certain threshold during summer months. The sales may increase during the summer months because the demand for natural gas during summer months may increase to support the increase in demand for air conditioners powered by natural gas generators. As such, Processor(s) 503 may execute computer-executable instructions stored in a memory in User Device 501 to determine, compute, and/or calculate one or more moving averages on the audit data (e.g., an autoregressive integrated moving average).

Logical intercommunication connections 500 may also include a connection between a host server that hosts applications that may be accessed by one or more user devices, and a storage array storing data relevant and/or necessary for the applications to execute. As an example, Host Server 505 may communicate with Storage Array 517 via a logical intercommunication connection between Processor(s) 515 and Processor(s) 533 and request data stored on one or more computer-readable media (e.g., Disk Drives 519 . . . 521). In particular, one or more computer-executable instructions and/or instruction sets may be executed by Processor(s) 509, in response to receiving a first signal from Processor(s) 503 requesting access to an application hosted by Host Server 505, that may cause Processor(s) 509 to send a second signal to Processor(s) 515 to execute one or more computer-executable instructions and/or instruction sets stored in Memory 513 to cause Processor(s) 515 to send a third signal to Processor(s) 533 to read data from one or more of Disk Drives 519 . . . 521 that may be relevant to the execution of the application by Processor(s) 509. In some embodiments, Processor(s) 503 may communicate with Processor(s) 509 via a data network connection that may be established between first a network interface card (NIC) communicatively coupled to Processor(s) 503 and a second NIC communicatively coupled to Processor(s) 509. For example, Host Server 505 and Proxy Server 511 may communicate with each other using a network connection similar to Connection 331.

Proxy Server 511 may store in a memory (e.g., Memory 513) one or more computer-executable instructions that may cause Processor(s) 515 to execute one or more computer-executable operations (e.g., Operations 523). The one or more computer-executable operations may include a read operation (e.g., Read Operation 525) wherein Processor(s) 515 may send data communication signals (e.g., Internet Protocol packets), to one or more processors (e.g., Processor(s) 533), including one or more computer-executable instructions which may cause Processor(s) 533 to cause a disk controller (not shown) controlling access to one or more computer-readable media (e.g., Disk Drives 519 . . . Disk Drives 521). In particular, Processor(s) 515 may send one or more data communication signals to Processor(s) 533 requesting data stored on one or more of Disk Drives 519 . . . Disk Drives 521. The one or more signals may include computer-executable instructions that may cause Processor(s) 533 to send one or more signals to the one or more disk controllers in Disk Drives 519 . . . Disk Drives 521 that may cause one or more read/write heads in each of Disk Drives 519 . . . Disk Drives 521 to transform electromagnetic signals to electrical signals to read data from a platter in Disk Drives 519 . . . Disk Drives 521. In some embodiments, the one or more read/write heads in each of Disk Drives 519 . . . Disk Drives 521 may transform received electrical signals to electromagnetic signals to write data to the platters. Thus, Processor(s) 515 may execute Read Operation 525 by sending a first signal to Processor(s) 533 which may in turn send a second signal to the disk controllers that may cause the disk controllers to move the read/write heads to a location on the platters associated with data that may be requested by Processor(s) 509 for an application being executed by Processor(s) 509. The read/write heads may transform one or more electromagnetic signals corresponding to the requested data on the platter to electrical signals, and may send the electrical signals to Processor(s) 533 which may in turn send a data communication signal to Processor(s) 509, via Processor(s) 515, including the requested data.

Processor(s) 533 may also send one or more signals to the disk controller to write (i.e., transform one or more electrical signals to electromagnetic signals) data to the platter. For example, Processor(s) 509 may receive data from Processor(s) 533 and may process the data and may determine that the processed data should be stored in one or more of Disk Drives 519 . . . Disk Drives 521 and thus may send one or more data communication signals, corresponding to the processed data, to Processor(s) 533 via Processor(s) 515, and Processor(s) 533 may store the processed data in Disk Drives 519 . . . Disk Drives 521. Memory 513 may store one or more first computer-executable instructions that may cause Processor(s) 515 to send one or more data communication signals including one or more second computer-executable instructions to cause Processor(s) 533 to store the processed data in a predetermined location on the platter of one or more of Disk Drives 519 . . . Disk Drives 521. In particular, the one or more second computer-executable instructions may cause Processor(s) 533 to write the processed data to the one or more platters and one or more locations on each platter on Disk Drives 519 . . . Disk Drives 521.

In some embodiments, Processor(s) 533 may write data to one or more computer-readable media in Disk Drives 519 . . . Disk Drives 521 using a format that may minimize the amount of time needed to read the data from the computer-readable media when a request for data is received. Processor(s) 533 may format data written to the computer-readable media into blocks of data in such a way that it is recognizable only by Processor(s) 533 and/or Processor(s) 515. For example, Processor(s) 515 may send a request to Processor(s) 533 to write data to one or more computer-readable media in one or more of Disk Drives 519 . . . Disk Drive 521. Processor(s) 533 may aggregate the data into one or more blocks using one or more compression algorithms such that when Processor(s) 533 receive a request to read the data, Processor(s) 533 may read the compressed data from the one or more computer-readable media and send the compressed data to Processor(s) 515. Processor(s) 515 may decompress the data and send it to Processor(s) 509.

Processor(s) 515 may also execute one or more other computer-executable instructions stored in Memory 513 to schedule an order in which one or more processes may be executed by Processor(s) 515. This may be referred to as process scheduling (e.g., Process Scheduling 525). The one or more processes may correspond to one or more second computer-executable instructions or may correspond to one more signals that may be received from another processor (e.g., Processor(s) 509 and/or Processor(s) 533). For example, the one or more first computer-executable instructions may cause Processor(s) 515 to assign a higher priority to a second process corresponding to processing a second request, received from Processor(s) 509, for data stored on Storage Array 517, and more particularly for data stored on one or more of Disk Drives 519 . . . Disk Drives 521, than a first process corresponding to processing a signal, received from Processor(s) 533, including data corresponding to a first request received from Processor(s) 509 for the data. The signal including the data corresponding to the first process may be data that a user device (e.g., User Device 501) may have requested from Storage Array 517 in the first request. In this exemplary scenario, Processor(s) 515 may have previously received the first request before the second request, but may process the second request first and process the signal corresponding to the first request second. Processor(s) 515 may process the processes in this order to send the requesting processor (i.e., Processor(s) 509 in this example) the data corresponding to the first and second requests in one signal, thereby reducing the amount of signaling needed to send data intended for the same processor. In some embodiments, Processor(s) 515 may execute processes corresponding to sending the data to Processor(s) 509 in the same order in which the requests for data are received. In other embodiments, Processor(s) 515 may execute processes based at least in part on a priority assigned to a request received from a processor (e.g., Processor(s) 509). For example, Process Scheduling 525 may cause Processor(s) 515 to assign a first priority to a first request for data based at least in part on a first priority indication in a first data communication signal corresponding to the first request and may assign a second priority to a second request for data based at least in part on a second priority indication in a second data communication signal corresponding to the second request wherein the first priority is higher than the second priority. As a result, if the first data communication signal arrives at Processor(s) 515 after the second data communication signal arrives, Processor(s) 515 may process the first data communication signal before it processes the second data communication signal and may send a third data communication signal to Processor(s) 533 to read data corresponding to the first request first, and then may send a fourth data communication signal to Processor(s) 533 to read data corresponding to the second request after the third data communication signal has been sent.

Processor(s) 515 may also perform one or more interrupt handling operations (e.g., Interrupt Handling 531). In some embodiments, Processor(s) 515 may include one or more electrical pins that may be electrically connected to other components in Proxy Server 511 such as Memory 513, a NIC (not shown), or disk drive (not shown), and may receive one or more electrical signals from these components to cause Processor(s) 515 to stop executing a process corresponding to one or more computer-executable instructions or instruction sets that it may be executing and may cause Processor(s) 515 to execute one or more other computer-executable instructions corresponding to the one or more electrical signals. Upon receiving the one or more electrical signals which may include one or more computer-executable instructions, Processor(s) 515 may store the one or more computer-executable instructions in Memory 513, save a state of the stopped process, then execute the one or more computer-executable instructions stored in Memory 513. This type of electrical signal may be referred to as an interrupt. The one or more interrupt handling operations (e.g., Interrupt Handling 531) may be one or more computer-executable instructions that may cause Processor(s) 515 to process the interrupt. For example, Interrupt Handling 531 may cause Processor(s) 515 to send a signal to Processor(s) 533 in response to an interrupt (e.g., a request for data) that may be received from Processor(s) 509 to read the data stored in one or more of Disk Drives 519 . . . Disk Drives 521. If Processor(s) 515 are executing one or more first computer-executable instructions and/or instruction sets when the interrupt is received, Processor(s) 515 may stop executing the one or more first computer-executable instructions and/or instruction sets that it may be executing and may execute one or more second computer-executable instructions and/or instruction sets to process the interrupt.

Processor(s) 515 may perform a filtering operation that may filter data read from Disk Drives 519 . . . Disk Drives 521 before it is sent to Processor(s) 509 in response to a request for data from Disk Drives 519 . . . Disk Drives 521. In some embodiments, Processor(s) 515 may use the operations in Operations 523 to filter the data. In other embodiments, Processor(s) 515 may use one or more other operations not included in Operations 523 to filter the data. Yet in other embodiments, Processor(s) 515 may use a combination of the operations in Operations 523 and the one or more operations not included in Operations 523. The filtering may correspond to one or more computer-executable instructions stored in Memory 513 that may cause Processor(s) 515 to filter data read from Disk Drives 519 . . . Disk Drives 521, as explained above, and send the filtered data to an intended destination device (e.g., Processor(s) 509). In particular, Memory 513 may store one or more computer-executable instructions which when executed by Processor(s) 515 may cause Processor(s) 515 to send a data communication signal (e.g., Internet Protocol packet) out a first NIC, communicatively coupled to Processor(s) 515 via a bus, which may send the data communication signal to a second NIC, communicatively coupled to Processor(s) 509, over one or more data networks (e.g., The Internet, a WAN, MAN, and/or LAN). Processor(s) 509 may execute the one or more computer-executable instructions in the data communication signal which may cause Processor(s) 509 to read Memory 507 to determine a relevancy context data associated with a first request for data that Processor(s) 515 may have previously received from Processor(s) 509. Processor(s) 509 may send the relevancy context data to Processor(s) 515 in a data communication signal, and the relevancy context data may include one or more computer-executable instructions which may cause Processor(s) 515 to send a second request for data to Processor(s) 533 to in response to the first request for data from Processor(s) 509 for data associated with the first request. As an example, Processor(s) 515 may receive a request, from Processor(s) 509, for a portion of sales data for one or more sales transactions within a month of sales transactions not inclusive of the entire month of sales transactions. For instance, an application executing on User Device 501 may audit the number of sales transactions within a given month wherein the total amount of money received by a business exceeds a certain threshold. Data corresponding to the entire month of sales transactions may be stored on a plurality of disks in Disk Drives 519 . . . Disk Drives 521, and Processor(s) 509 may receive a request from Processor(s) 503 for data corresponding to sales transactions within a given month wherein the total amount of money received by the business exceeds a threshold, but is not inclusive of all sales transactions for the month. In other words, Processor(s) 503 may request a subset of all sales data for the entire month. Memory 507 may store computer-executable instructions that may cause a processor to locate a subset of data corresponding to the sales transactions within the given month wherein the total amount of money received by the business exceeds the threshold. The computer-executable instructions may have been stored in Memory 507 based on a previous request for the same subset of data, or it may be based at least in part on another subset of data that may indicate how data and where one or more subsets of data are stored on the disk drives. Processor(s) 509 may send one or more data communication signals including the computer-executable instructions that may cause Processor(s) 515 to read a subset of all sales data stored on Disk Drives 519 . . . Disk Drives 521. The one or more computer-executable instructions that may cause Processor(s) 515 to read and send the subset of data to Processor(s) 509 may be referred to as an output filter operation (e.g., Output Filter 423). Accordingly, Output Filter 527 may be implemented when Processor(s) 515 execute the one or more computer-executable instructions to read subsets of data stored on one or more disk drives in for example Disk Drives 519 . . . Disk Drives 521.

In some embodiments, User Device 501, or more particularly Processor(s) 503 may execute one or more computer-executable instructions corresponding to an application, hosted on Host Server 505 that may cause Processor(s) 509 to request data from Storage Array 517 using a specific instruction set. For example, Processor(s) 503 may execute one or more computer-executable instructions corresponding to an application command including one or more computer-executable instructions which may cause Processor(s) 509 to request data from Storage Array 517. In some embodiments, relevancy context data may be initiated by Host Server 505, or more specifically Processor(s) 509. Storage Array 517 may contain proprietary database files, CSV files, XML files, text files, documents, or other files, etc. In some embodiments, the application command may correspond to an application or RDBMS on Host Server 505.

The one or more computer-executable instructions may be based at least in part on a RDBMS or a relational data stream management system (RDSMS) instruction set or operating system file input/output (I/O) instruction set. In some embodiments the RDBMS or RDSMS instruction set may be a SQL instruction set. Processor(s) 509 may store the one or more computer-executable instructions corresponding to the application command in Memory 507 after receiving the one or more computer-executable instructions. Processor(s) 509 may execute the SQL instruction set thereby causing Processor(s) 509 to send a request to Processor(s) 515 for data based at least in part on the command executed by Processor(s) 503. The request may be a first SQL query or a file I/O request. Processor(s) 515 may receive the first SQL query or file I/O request for the requested data and may send an information request back to Processor(s) 509 via an API call for relevancy context data which may be data read from Memory 507 by Processor(s) 509 for relevancy context data which may be data based at least in part on the requested data. The requested data may be stored in one or more of Disk Drives 519 . . . Disk Drives 521 in a table format or file format, wherein the table includes rows and columns that may be stored as a heap file, heap table, B+ tree and the file format could be a text file such as CSV, XML, JSON or a binary format such as a compressed archive like sound, images, video files. In some embodiments, the data in the table may be stored using row-oriented storage, wherein all data associated with a given row is stored in the same storage location. In other embodiments, the data in the table may be stored using a column-oriented storage, wherein all data associated with a given column is stored in the same storage location. As an example, the relevancy context data may indicate which rows, columns, and/or predicates (e.g., relational operators including equal to, not between, greater than, greater than or equal to, less than, less than or equal to, IN, BETWEEN, LIKE, IS NULL, IS NOT NULL) may have been included in the command Thus, Processor(s) 515 may determine the relevancy context, for example that the requested data corresponding to the command corresponds to one or more rows and/or one or more columns and one or more predicates applied to the one or more rows and one or more columns. For example, the command may correspond to a request for data in the second row and twenty-ninth through thirty-fifth columns, thirtieth through forty-first rows and sixty-ninth through seventy-fifth columns, and a twenty-ninth through fortieth rows and first column wherein the elements (intersection of a column and row) satisfy one or more predicate relationships (e.g., each element is greater than a first value but between two values both of which are strictly greater than the first value). Accordingly, the relevancy context stored in Memory 507 may determine the elements stored in the table in one or more of Disk Drives 519 . . . Disk Drives 521. Processor(s) 509 may send a third SQL query to Processor(s) 515 in response to the second SQL query received from Processor(s) 515 including the relevancy context data. Processor(s) 515 may execute one or more computer-executable instructions that may cause Processor(s) 515 to send a data communication signal to Processor(s) 533 which may in turn send a signal to a disk controller that may retrieve the entire table or a portion of the table including the requested data from one or more of Disk Drives 519 . . . Disk Drives 521. Processor(s) 533 may receive one or more signals from the disk controller including the requested data, and my execute one or more computer-executable instructions that may cause Processor(s) 533 to send the requested data to Processor(s) 515 using one or more data communication signals. Processor(s) 515 may execute Output Filter 527 which may cause Processor(s) 515 to store only the data from the table or portion of the table relevant to the requested data. Processor(s) 515 may execute computer-executable instructions corresponding to the received relevancy context data stored in Memory 513 while executing Output Filter 527 which will cause Processor(s) 515 to store only the data relevant to the request. Processor(s) 515 may then execute one or more computer-executable instructions that causing Processor(s) 515 to send the data stored in Memory 513 to Processor(s) 509.

Processor(s) 515 may filter the rows of the table relevant to the requested data by executing one or more first computer-executable instructions corresponding to a row filtering operation in Output Filter 527 based on one or more second computer-executable instructions corresponding to the relevancy context data. This may be referred to as slicing data in the table horizontally. Processor(s) 515 may filter the columns of the table relevant to the requested data by executing one or more third computer-executable instructions corresponding to a column filtering operation in Output Filter 527 based on one or more fourth computer-executable instructions corresponding to the relevancy context data.

Figure 6:
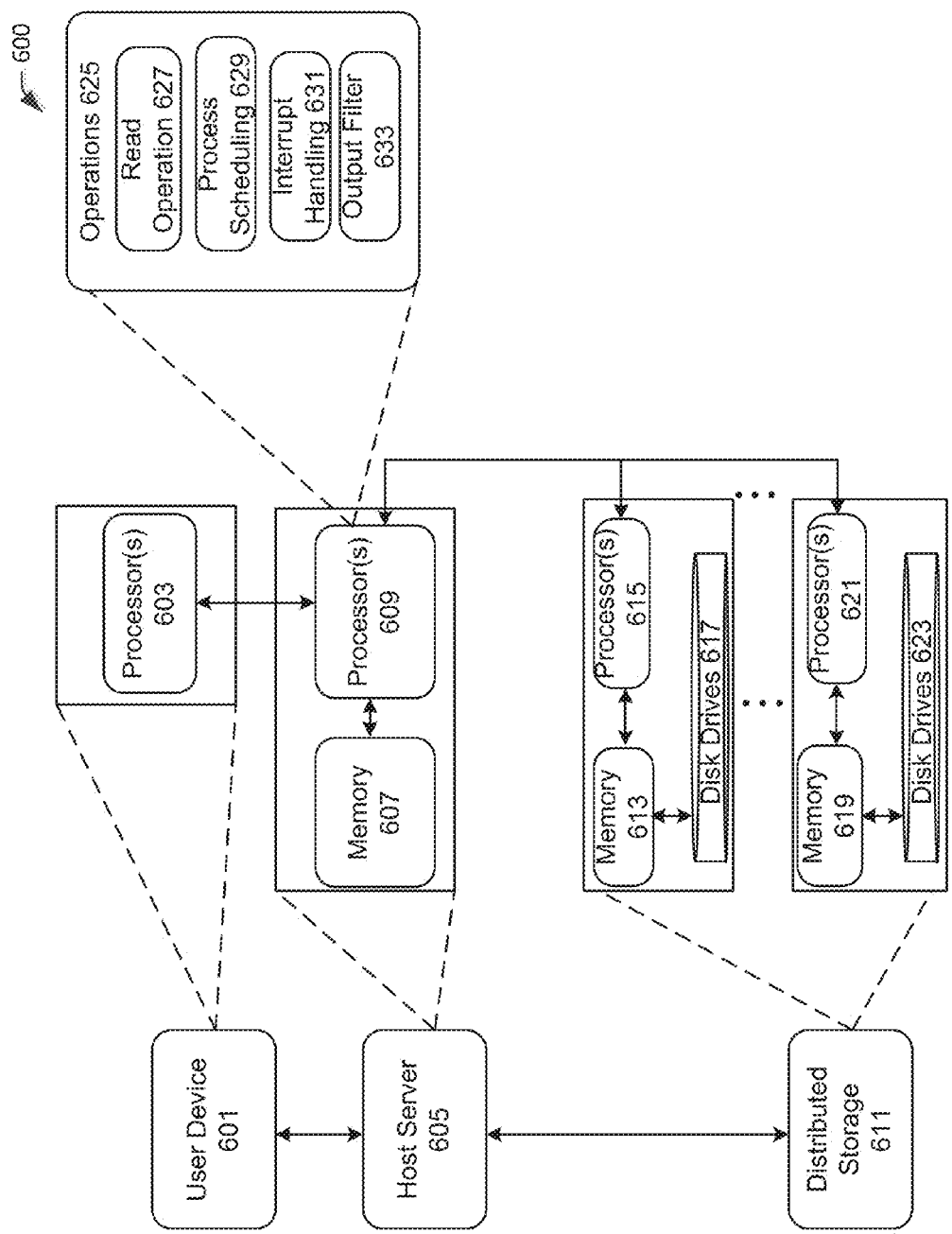
FIG. 6 is a schematic block diagram depicting intercommunication connections between one or more components of an illustrative user device, server device, and storage device in accordance with one or more embodiments of the disclosure.

FIG. 6 is a schematic block diagram depicting intercommunication connections between one or more components of an illustrative user device, server device, and storage device in accordance with one or more embodiments of the disclosure.

Logical intercommunication connections 600 may include logical connections between one or more processors in a user device requesting access to one or more applications that may be executed by one or more processors in a host server hosting the one or more applications. Logical intercommunication connections 600 may include logical connections between one or more processors on the host server requesting access to data stored in one or more computer-readable media stored on a storage device. The user device (e.g., User Device 601) may include, among other electrical components, one or more processors (e.g., Processor(s) 603) that may be communicatively connected to one or more processors (e.g., Processor(s) 609) in the host server (e.g., Host Server 605) via one or more data networks. The host server may include a memory (e.g., Memory 607) that may store one or more computer-executable instructions and/or instruction sets that may be executed by the one or more processors in the host server. In some embodiments, the one or more computer-executable instructions and/or instruction sets may be executed by the one or more processors in the host server in response to the one or more processors in the user device. For example, Processor(s) 603 may send a data communication signal (e.g., Internet Protocol packet) to Processor(s) 609 including one or more computer-executable instructions causing Processor(s) 609 to execute one or more computer-executable instructions in Memory 607 that cause Processor(s) 609 to read data stored on one or more computer-readable media. The data read from the one or more computer-readable media may be used by Processor(s) 609 to execute the one or more computer-executable instructions and/or instruction sets. The execution of the one or more computer-executable instructions and/or instruction sets may correspond to an application hosted on Host Server 605 to one or more user devices (e.g., User Device 601). For example, Host Server 605 may host an application including one or more computer-executable instructions which when executed by Processor(s) 609, in response to Processor(s) 603 sending a data communication signal to Processor(s) 609, cause Processor(s) 609 to send a signal to Processor(s) 603 causing Processor(s) 603 to send a signal to a display on User Device 601 to display the application being executed by Processor(s) 609. For instance, User Device 601 may request access to an application executing on Processor(s) 609 that may provide access to data relevant to one or more sales transactions within a month of sales transactions not inclusive of the entire month of sales transactions. The application may create an audit data of the number of sales transactions within a given month wherein the total amount of money received by a business exceeds a certain threshold. Thus, Processor(s) 609 may send a signal to Processor(s) 603 including the audit data, and Processor(s) 603 may display the data on a display. In some embodiments, User Device 601 may include one or more first computer-executable instructions stored in a memory that may cause Processor(s) 603 to determine, compute, and/or calculate data using the audit data. In some embodiments, Processor(s) 603 may determine statistical trends in the audit data. For example, Processor(s) 603 may determine that the audit data exhibits and/or contains perennial characteristics corresponding to changes in seasons. For instance, the audit data may contain sales of a natural gas business that exceed a certain threshold during summer months. The sales may increase during the summer months because the demand for natural gas during summer months may increase to support the increase in demand for air conditioners powered by natural gas generators. As such, Processor(s) 603 may execute computer-executable instructions stored in a memory in User Device 601 to determine, compute, and/or calculate one or more moving averages on the audit data (e.g., an autoregressive integrated moving average).

Logical intercommunication connections 600 may also include a connection between a host server that hosts applications that may be accessed by one or more user devices, and one or more distributed storage devices storing data relevant and/or necessary for the applications to execute. As an example, Host Server 605 may communicate with Distributed Storage 611 via a logical intercommunication connection between Processor(s) 609 and Processor(s) 615 . . . Processor(s) 621 and request data stored on one or more computer-readable media in Distributed Storage 611 (e.g., Disk Drives 617 . . . 621). Although Distributed Storage 611 is depicted as a single device, Memory 613, Processor(s) 615, and Disk Drive 617 may form a first computing device that may be physically located in a first location (e.g., Bangalore, India) and Memory 619, Processor(s) 621, and Disk Drive 623 may form a second computing device that may be physically located in a second location (e.g., Leeds, United Kingdom). One or more computer-executable instructions and/or instruction sets, stored in Memory 607, may be executed by Processor(s) 609, in response to receiving a first signal from Processor(s) 603 requesting access to an application hosted by Host Server 605, that may cause Processor(s) 609 to a first signal to Processor(s) 615 . . . Processor(s) 621 to read data from one or more of Disk Drives 617 . . . 623 that may be relevant to the execution of the application by Processor(s) 609. In some embodiments, Processor(s) 603 may communicate with Processor(s) 609 via a data network connection that may be established between first a network interface card (NIC) communicatively coupled to Processor(s) 603 and a second NIC communicatively coupled to Processor(s) 609. For example, User Device 601 and Host Server 605 may communicate with each other using a network connection similar to Connection 331.

Host Server 605 may store in a memory (e.g., Memory 607) one or more computer-executable instructions that may cause Processor(s) 609 to execute one or more computer-executable operations (e.g., Operations 625). The one or more computer-executable operations may include a read operation (e.g., Read Operation 627) wherein Processor(s) 609 may send data communication signals (e.g., Internet Protocol packets), to one or more processors (e.g., Processor(s) 615 . . . Processor(s) 621), including one or more computer-executable instructions which may cause Processor(s) 615 . . . Processor(s) 621 to cause a disk controller (not shown) controlling access to one or more computer-readable media (e.g., Disk Drives 617 . . . Disk Drives 623). In particular, Processor(s) 609 may send one or more data communication signals to Processor(s) 615 . . . Processor(s) 621 requesting data stored on one or more of Disk Drives 617 . . . Disk Drives 623. The one or more signals may include computer-executable instructions that may cause Processor(s) 615 . . . Processor(s) 621 to send one or more signals to the one or more disk controllers in Disk Drives 617 . . . Disk Drives 623 that may cause one or more read/write heads in each of Disk Drives 617 . . . Disk Drives 623 to transform electromagnetic signals to electrical signals to read data from a platter in Disk Drives 617 . . . Disk Drives 623. In some embodiments, the one or more read/write heads in each of Disk Drives 617 . . . Disk Drives 623 may transform received electrical signals to electromagnetic signals to write data to the platters.

In some embodiments Processor(s) 609 may send one or more first computer-executable instructions, including a high-level data request, in one or more data communication signals that may cause Processor(s) 615 . . . Processor(s) 621 to execute one or more second computer-executable instructions, to cause Processor(s) 615 . . . Processor(s) 621 to read data, corresponding to the data request, from one or more of Disk Drives 617 . . . Disk Drives 623. For example, the high-level data request may include extensions that may cause Processor(s) 615 . . . Processor(s) 621 to process a request for data using a push down filter, pull down filter, based on relevancy context data, received from Processor(s) 609. Thus, Processor(s) 609 may execute Read Operation 627 by sending a first signal to Processor(s) 615 . . . Processor(s) 621 which may in turn send a second signal to the disk controllers that may cause the disk controllers to move the read/write heads to a location on the platters associated with data that may be requested by Processor(s) 609 for an application being executed by Processor(s) 609. The read/write heads may transform one or more electromagnetic signals corresponding to the requested data on the platter to electrical signals, and may send the electrical signals to Processor(s) 615 . . . Processor(s) 621 which may in turn send a data communication signal to Processor(s) 609, including the requested data. Processor(s) 615 . . . Processor(s) 621 may also send one or more signals to the disk controller to write (i.e., transform one or more electrical signals to electromagnetic signals) data to the platter. For example, Processor(s) 609 may receive data from Processor(s) 615 . . . Processor(s) 621 and may process the data and may determine that the processed data should be stored in one or more of Disk Drives 617 . . . Disk Drives 623 and thus may send one or more data communication signals, corresponding to the processed data, to Processor(s) 615 . . . Processor(s) 621, and Processor(s) 615 . . . Processor(s) 621 may store the processed data in Disk Drives 617 . . . Disk Drives 623. Memory 607 may store one or more first computer-executable instructions that may cause Processor(s) 609 to send one or more data communication signals including one or more second computer-executable instructions to cause Processor(s) 615 . . . Processor(s) 621 to store the processed data in a predetermined location on the platter of one or more of Disk Drives 617 . . . Disk Drives 623. In particular, the one or more second computer-executable instructions may cause Processor(s) 615 . . . Processor(s) 621 to write the processed data to the one or more platters and one or more locations on each platter on Disk Drives 617 . . . Disk Drives 623. Memory 607 may include one or more computer-executable instructions that may cause Processor(s) 609 to filter data in a table horizontally. This may reduce the amount of bandwidth required by Processor(s) 609 to send a data communication signal including the data corresponding to a request for the data to the requesting processors (e.g., Processor(s) 603).

In some embodiments Processor(s) 609 may read relevancy context data from Memory 607. The relevancy context data may include predicates and/or column projections. Processor(s) 609 may prepare instructions for Processor(s) 615 and 621 in the form of a SQL-on-Hadoop query. Based on the relevancy context, this query can include pushed filters (filters on the offloaded dataset residing in part on Distributed Storage 611), pulled join filters (filters on tables that are joined to the offloaded dataset that can be pre-processed to generate additional filters for the SQL-on-Hadoop query), and/or column pruning (filters on the list of columns projected in the SQL-on-Hadoop query). Processor(s) 615 . . . Processor(s) 621 may receive the instruction in the form of the SQL-on-Hadoop query and these processors may execute the SQL-on-Hadoop query on Distributed Storage 611. Thus, the filtering-during-retrieval may be performed by Output Filter 643 . . . Output Filter 653 on Distributed Storage 611.

Processor(s) 609 may also have to perform all filtering required by the relevancy context data, in addition to the relevancy context parameters that are passed to Processor(s) 615 . . . Processor(s) 621. Because of this, in some embodiments, Output Filter 633 may have a greatly reduced dataset on which to perform this filtering.

Processor(s) 609 may also format the data corresponding to the data request according to a format specified by the requesting processor (e.g., Processor(s) 603) before returning the data to the requesting processor. The format may be based at least in part on the architecture of the requesting processor. The format may also be based on one or more operations that the requesting processor may be executing at a certain time. For example, the requesting processor may executer one or more operations at the same time and based on the resources available to process the requested data after it is received, the requesting processor may request in addition to the data from Processor(s) 609 that the requested data be formatted to minimize the number of resources necessary for the requesting processor to process the data. In some embodiments, the format of the data may be based on one or more applications being executed by the requesting processor. For example, three applications may be executed on the requesting processor at the same time and may each require the data to be formatted in a particular format. Accordingly, Processor(s) 609 may format the data so that the requesting processor may execute the three applications using the requested data in the format necessary for the three applications to be executed.

Processor(s) 609 may also execute one or more other computer-executable instructions stored in Memory 607 to schedule an order in which one or more processes may be executed by Processor(s) 609. This may be referred to as process scheduling (e.g., Process Scheduling 629). The one or more processes may correspond to one or more second computer-executable instructions or may correspond to one or more signals that may be received from another processor (e.g., Processor(s) 603 and/or Processor(s) 615 . . . Processor(s) 621). For example, the one or more first computer-executable instructions may cause Processor(s) 609 to assign a higher priority to a second process corresponding to processing a second request, received from Processor(s) 603, for data stored on Distributed Storage 611, and more particularly for data stored on one or more of Disk Drives 617 . . . Disk Drives 623, than a first process corresponding to processing a signal, received from one or more of Processor(s) 615 . . . Processor(s) 621, including data corresponding to a first request received from Processor(s) 609 for the data. The signal including the data corresponding to the first process may be data that a user device (e.g., User Device 601) may have requested from Distributed Storage 611 in the first request. In this exemplary scenario, Processor(s) 609 may have previously received the first request before the second request, but may process the second request first and process the signal corresponding to the first request second. Processor(s) 615 . . . Processor(s) 621 may process the processes in this order to send the requesting processor (i.e., Processor(s) 609 in this example) the data corresponding to the first and second requests in one data communication signal, thereby reducing the amount of signaling needed to send data intended for the same processor. In some embodiments, Processor(s) 609 may execute processes corresponding to sending the data to Processor(s) 603 in the same order in which the requests for data are received. In other embodiments, Processor(s) 609 may execute processes based at least in part on a priority assigned to a request received from a processor (e.g., Processor(s) 603). For example, Process Scheduling 629 may cause Processor(s) 609 to assign a first priority to a first request for data based at least in part on a first priority indication in a first data communication signal corresponding to the first request and may assign a second priority to a second request for data based at least in part on a second priority indication in a second data communication signal corresponding to the second request wherein the first priority is higher than the second priority. As a result, if the first data communication signal arrives at Processor(s) 609 after the second data communication signal arrives, Processor(s) 609 may process the first data communication signal before it processes the second data communication signal and may send a third data communication signal to Processor(s) 615 . . . Processor(s) 621 to read data corresponding to the first request first, and then may send a fourth data communication signal to Processor(s) 615 . . . Processor(s) 621 to read data corresponding to the second request after the third data communication signal has been sent.

Processor(s) 609 may also perform one or more interrupt handling operations (e.g., Interrupt Handling 631). In some embodiments, Processor(s) 609 may include one or more electrical pins that may be electrically connected to other components in Host Server 605 such as Memory 607, a NIC (not shown), or disk drive (not shown), and may receive one or more electrical signals from these components to cause Processor(s) 609 to stop executing a process corresponding to one or more computer-executable instructions or instruction sets that it may be executing and may cause Processor(s) 609 to execute one or more other computer-executable instructions corresponding to the one or more electrical signals. Upon receiving the one or more electrical signals which may include one or more computer-executable instructions, Processor(s) 609 may store the one or more computer-executable instructions in Memory 607, save a state of the stopped process, then execute the one or more computer-executable instructions stored in Memory 607. This type of electrical signal may be referred to as an interrupt. The one or more interrupt handling operations (e.g., Interrupt Handling 631) may be one or more computer-executable instructions that may cause Processor(s) 609 to process the interrupt. For example, Interrupt Handling 631 may cause Processor(s) 615 to send a signal to Processor(s) 615 . . . Processor(s) 621 in response to an interrupt (e.g., a request for data) that may be received from Processor(s) 603 to read the data stored in one or more of Disk Drives 617 . . . Disk Drives 623. If Processor(s) 609 are executing one or more first computer-executable instructions and/or instruction sets when the interrupt is received, Processor(s) 609 may stop executing the one or more first computer-executable instructions and/or instruction sets that it may be executing and may execute one or more second computer-executable instructions and/or instruction sets to process the interrupt.

Processor(s) 609 may perform a filtering operation that may filter data read from Disk Drives 617 . . . Disk Drives 623 before it is sent to Processor(s) 603 in response to a request for data from Disk Drives 617 . . . Disk Drives 623. In some embodiments, Processor(s) 609 may use the operations in Operations 625 to filter the data. In other embodiments, Processor(s) 609 may use one or more other operations not included in Operations 625 to filter the data. Yet in other embodiments, Processor(s) 609 may use a combination of the operations in Operations 625 and the one or more operations not included in Operations 625. The filtering may correspond to one or more computer-executable instructions stored in Memory 607 that may cause Processor(s) 609 to filter data read from Disk Drives 617 . . . Disk Drives 623, and send the filtered data to an intended destination device (e.g., Processor(s) 603). In particular, Memory 607 may store one or more first computer-executable instructions that cause Processor(s) 609 to send a data communication signal (e.g., Internet Protocol packet) out a first NIC, communicatively coupled to Processor(s) 609 via a bus, to a distributed storage device (e.g., Distributed Storage 611) when Processor(s) 609 receive a request for data from the distributed storage device from Processor(s) 603. In particular Processor(s) 609 may send the data communication signal to NICs, communicatively coupled to Processor(s) 615 . . . Processor(s) 621, over one or more data networks (e.g., The Internet, a WAN, MAN, and/or LAN). Processor(s) 603 may execute one or more other computer-executable instructions that cause Processor(s) 609 to read Memory 607 to determine a relevancy context data associated with a first request for data that Processor(s) 609 may have previously received from Processor(s) 603. The relevancy context data may include one or more computer-executable instructions which may cause Processor(s) 609 to send a second request for data to Processor(s) 615 . . . Processor(s) 621 in response to a first request for data received from Processor(s) 603 for data associated with the first request. As an example, Processor(s) 609 may receive a request, from Processor(s) 603, for a portion of sales data for one or more sales transactions within a month of sales transactions not inclusive of the entire month of sales transactions. For instance, an application executing on User Device 601 may audit the number of sales transactions within a given month wherein the total amount of money received by a business exceeds a certain threshold. Data corresponding to the entire month of sales transactions may be stored on a plurality of disks in Disk Drives 617 . . . Disk Drives 623, and Processor(s) 609 may receive a request from Processor(s) 603 for data corresponding to sales transactions within a given month wherein the total amount of money received by the business exceeds a threshold, but is not inclusive of all sales transactions for the month. In other words, Processor(s) 603 may request a subset of all sales data for the entire month. Memory 607 may store computer-executable instructions that may cause a processor to locate a subset of data corresponding to the sales transactions within the given month wherein the total amount of money received by the business exceeds the threshold. The computer-executable instructions may have been stored in Memory 607 based on a previous request for the same subset of data, or it may be based at least in part on another subset of data that may indicate how data and where one or more subsets of data are stored on the disk drives. Processor(s) 603 may send one or more data communication signals including the computer-executable instructions that may cause Processor(s) 609 to read a subset of all sales data stored on Disk Drives 617 . . . Disk Drives 623. The one more computer-executable instructions that may cause Processor(s) 609 to read and send the subset of data to Processor(s) 603 may be referred to as an output filter operation (e.g., Output Filter 633). Accordingly, Output Filter 633 may be implemented when Processor(s) 609 execute the one or more computer-executable instructions to read subsets of data stored on one or more disk drives in for example Disk Drives 617 . . . Disk Drives 623.

Memory 613 . . . Memory 619 may store one or more computer-executable instructions that may cause Processor(s) 615 . . . Processor(s) 621 to execute read commands that may cause a disk controller to read data from a computer-readable media or to execute write commands that may cause the disk controller to write data to the computer-readable media. For example, Processor(s) 615 . . . Processor(s) 621 may execute computer-executable instructions stored in Memory 613 . . . Memory 619 respectively that may cause Processor(s) 615 . . . Processor(s) 621 to read data from Disk Drives 617 . . . Disk Drives 623 respectively or write data to Disk Drives 617 . . . Disk Drives 623 respectively.

Memory 613 . . . Memory 619 may store one or more other computer-executable instructions that may cause Processor(s) 615 . . . Processor(s) 621, to perform Operations 635 . . . Operations 645 respectively. In some embodiments the one or more computer-executable instructions stored in Memory 613 . . . Memory 619 may be different and Processor(s) 615 . . . Processor(s) 621 may not be the same. Thus Operations 635 . . . Operations 645 may be the same as Operations 625, but may be executed in a different way based on the one or more computer-executable instructions and the processors they are executed on.

When Processor(s) 615 . . . Processor(s) 621 receive a request for data from Processor 609, Processor(s) 615 . . . Processor(s) 621 may filter data stored on a table in Disk Drives 617 . . . Disk Drives 623 using push filters, pull filters, and/or prune rows and/or columns of the table thereby reducing the amount of data that may need to be sent back to Processor(s) 609 when data is requested from Processor(s) 615 . . . Processor(s) 621. In some embodiments, Processor(s) 615 . . . Processor(s) 621 may perform results filtering (e.g., horizontal or row filtering) and column filtering (e.g., vertical filtering). Processor(s) 615 . . . Processor(s) 621 also format the filtered data, as explained above; so that Processor(s) 609 does not have to format the data after it is received. The format might be based at least in part on one or more filtering operations that Processor(s) 609 might perform on the filtered data. For example, Processor(s) 615 . . . Processor(s) 621 may execute one or more computer-executable instructions that cause Processor(s) 615 . . . Processor(s) 621 to execute Output Filter 643 . . .

Output Filter 653 respectively, wherein Output Filter 643 . . . Output Filter 653 may include push filters and/or pull filters that reduce the number of rows and/or columns that may be returned to Processor(s) 609. For instance, Processor(s) 615 . . . Processor(s) 617 may apply one or more push filters and/or pull filters that may extract a first subset of rows and a first subset of columns. The first subset of rows and first subset of columns may be returned to Processor(s) 609. In some embodiments, Processor(s) 615 . . . Processor(s) 617 may apply the one or more push filters and/or pull filters sending one or more low-latency SQL queries to Disk Drives 617 . . . Disk Drives 623 using a parallel processing SQL query engine (e.g., Cloudera Impala). This may be referred to as pre-filtering. Processor(s) 609 may further filter the first subset or rows and first subset of columns by executing Output Filter 633 on the first subset of rows and the first subset of columns In some embodiments, Processor(s) 615 . . . Processor(s) 621 may compress the first subset of rows and the first subset of columns by aggregating the first subset of rows and aggregating the first subset of columns in such a way that a receiving processor (e.g., Processor(s) 609) can disaggregate the aggregated first subset of rows and aggregated first subset of columns. This may be done by Processor(s) 615 . . . Processor(s) 621 to reduce the amount of bandwidth used to send the first subset of rows and the first subset of columns to Processor(s) 609, to minimize the amount of space required to store the first subset of rows and the first subset of columns in Host Server 605, and minimize the number of processor resources (e.g., clock cycles to execute any of Operations 625) needed to process the requested data. Because only the relevant subsets of data are returned, the number of clock cycles is effectively reduced because Processor(s) 609 will execute Operations 625 on less data. For example, Processor(s) 609 may execute Output Filter 633 on the disaggregated first subset of rows and the disaggregated first subset of columns, and may apply one or more push filters and/or pull filters, and/or may prune the first subset of rows and the first subset of columns Processor(s) 609 may only return the relevant data to the request from the filtered and/or pruned first subset of rows and first subset of columns to a requesting processor (e.g., Processor(s) 603).

Figure 7:
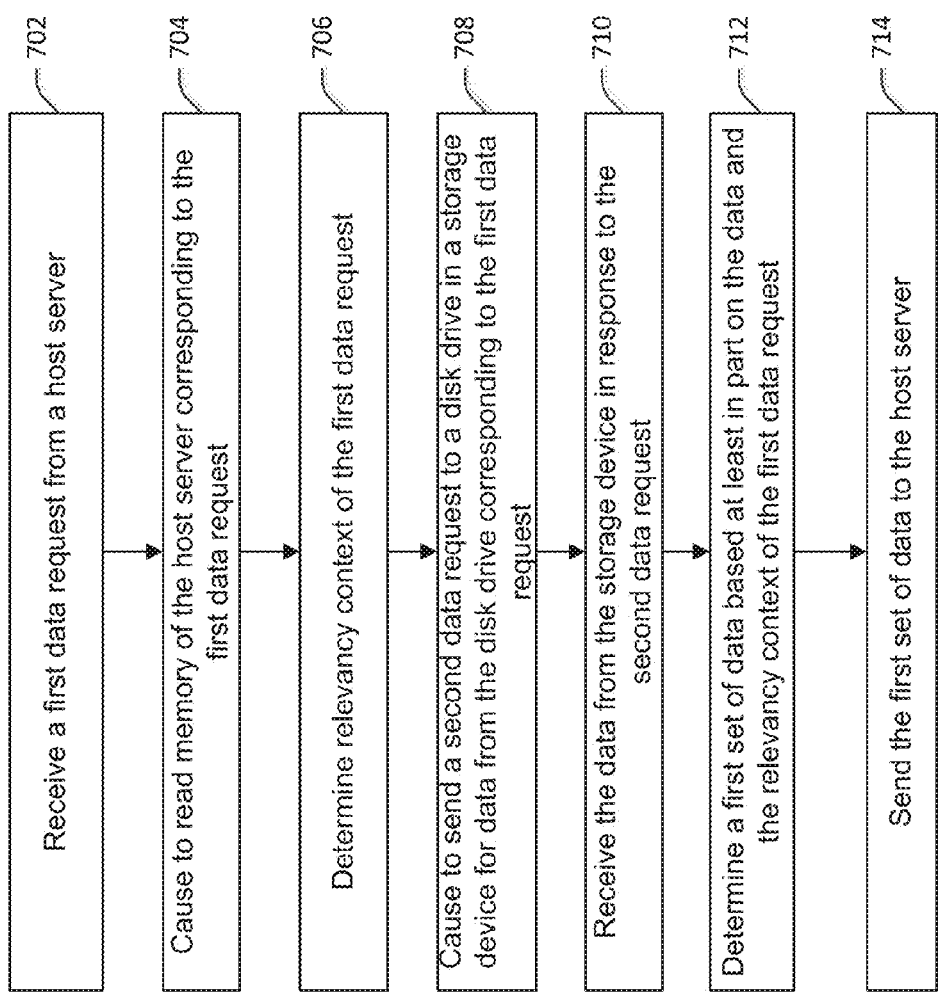
FIG. 7 depicts an illustrative process for requesting data from a storage device, in accordance with one or more embodiments of the disclosure.

FIG. 7 depicts an illustrative process for requesting data from a storage device, in accordance with one or more embodiments of the disclosure. One or more processors may perform one or more steps of a process (e.g., Process 700) including one or more blocks that may occur in the same order as shown in FIG. 7 or may occur in another order.

The process may begin in block 702 in which a processor may receive a first data request from a host server. The processor may be a processor executing one or more computer-executable instructions in a storage device (e.g., Backend Storage 411). In some embodiments, the one or more computer-executable instructions may correspond to computer-executable instructions that may not be native to the storage device. For example, the storage device may store in a memory one or more native computer-executable instructions that may cause the processor to execute one or more functions associated with a storage device. For instance, the one or more computer-executable instructions may include instructions which when executed by the processor may cause the processor to determine a location of data in a computer-readable media in the storage device (e.g., Disk Drive 417). The processor (e.g., one or more of Processor(s) 415) may execute one or more computer-executable instructions, stored in a memory (e.g., Memory 413), that may cause the processor to perform one or more operations including but not limited the operations including Operations 419.

The process may progress to block 704 in which the processor may execute one or more computer-executable instructions that may cause the processor to read a memory of the host server corresponding to the first data request. The processor may send one or more data communication signals to a processor in the host server for information relevant to the first data request. In particular, the processor may request relevancy context data associated with the first data request. In some embodiments, the relevancy context data may be data including a structure of the request. For instance, the structure of the request may correspond to specific parameters associated with the request. The parameters may include when the data was stored, how old the data is, a range of data (e.g., data corresponding to a certain time period). For example, the relevancy context data may include one or more parameters associated with sales data for all Mondays in a given year between the hours 11:00 a.m. and 2:00 p.m. Accordingly, the processor may use this request to determine rows and/or columns in a table including the data relevant to the request using one or more predicates, in the case of a SQL request, or one or more filter operations as explained below to select only the relevant data to return to a processor in the host server. This may be referred to as pre-filtering.

After the processor in the storage device sends the one or more data communication signals to the processor in the host server, the processor in the storage device may determine a relevancy context of the first data request (block 706). That is the processor in the storage device may receive and determine that the data requested by the host server may only be a subset of data that may be used to execute an application currently executing on the host server. For example, an application executing on the host server may ingest data stored on the storage device to execute the application, but the processor in the host server may only require a subset of data determined by one or more parameters instead of all of the data to execute the application, and the subset of data may correspond to data associated with the first data request.

The process may progress to block 708, after completing block 706, and the processor in the storage device may execute one or more computer-executable instructions that may cause the processor to send a second data request to a disk drive in a storage device for data from the disk drive corresponding to the first data request. As explained above, the processor in the storage device may send one or more electrical signals to a disk controller that may cause the disk controller to transform electromagnetic signals corresponding to the requested data into electrical signals and send an electrical signal back to the processor in the storage device including data corresponding to the requested data. The data corresponding to the requested data may not be just the requested data, but may include more than just the requested data. For example, the first data request may be for a subset of the data that may be returned from the disk drive, but the disk controller may return data including the subset of the data.

The process may then progress to block 710, and the processor in the storage device may receive the data from the storage device in response to sending the second data request. The process may then progress to block 712, and the processor may determine a first set of data based at least in part on the data and the relevancy context of the first data requested. In particular, the processor in the storage device may execute one or more computer-executable instructions stored in a memory that may cause the processor to filter the data received from the disk drives so that only the requested subset of data is returned to the processor in the host server. The processor in the storage device may execute computer-executable instructions that may cause the processor to implement an output filter operation (e.g., Output Filter 423), to determine the first set of data.

After the process completes block 712, the process may progress to block 714 and the processor in the storage device may send the first set of data to the processor in the host server. After the processor in the storage device sends the first set of data to the processor in the host server process 700 may end.

Figure 8:
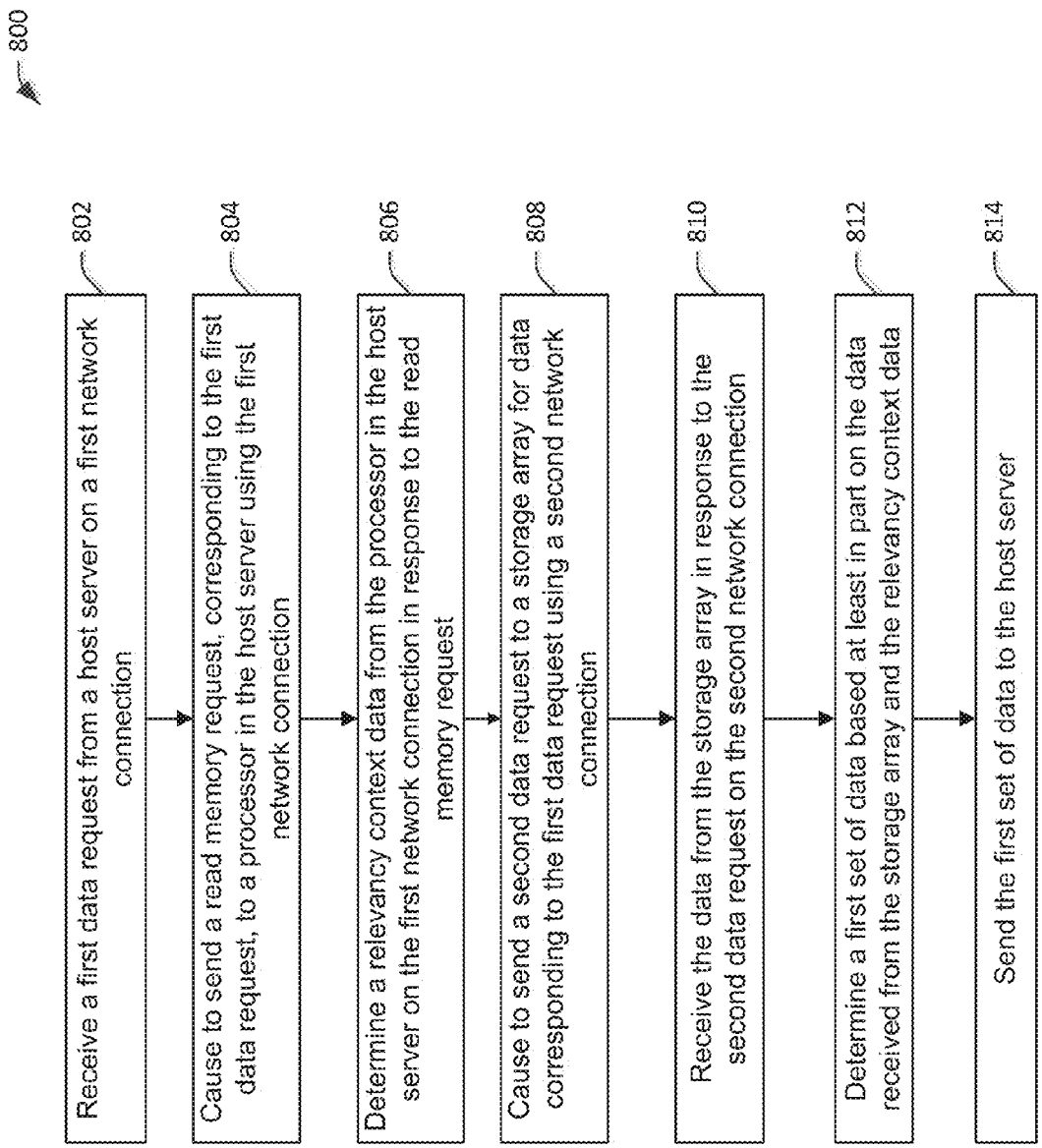
FIG. 8 depicts an illustrative process for requesting data from a storage device, in accordance with one or more embodiments of the disclosure.

FIG. 8 depicts an illustrative process for requesting data from a storage device, in accordance with one or more embodiments of the disclosure. One or more processors may perform one or more steps of a process (e.g., Process 800) including one or more blocks that may occur in the same order as shown in FIG. 8 or may occur in another order.

The process may begin in block 802 in which a processor may receive a first data request from a host server on a first network connection. The processor may be a processor executing one or more computer-executable instructions in a proxy server (e.g., Proxy Server 511). The processor (e.g., one or more of Processor(s) 515) may execute one or more computer-executable instructions, stored in a memory (e.g., Memory 513), that may cause the processor to perform one or more operations including but not limited the operations including Operations 523.

The process may progress to block 804 in which the processor may execute one or more computer-executable instructions that may cause the processor to send a read memory request, corresponding to the first data request, to a processor in the host server using the first network connection. The processor may send one or more data communication signals to a processor in the host server for information relevant to the first data request. In particular, the processor may request relevancy context data associated with the first data request. In some embodiments, the relevancy context data may be data including a structure of the request. For instance, the structure of the request may correspond to specific parameters associated with the request. The parameters may include when the data was stored, how old the data is, a range of data (e.g., data corresponding to a certain time period). For example, the relevancy context data may include one or more parameters associated with sales data for all Mondays in a given year between the hours 11:00 a.m. and 2:00 p.m. Accordingly, the processor may use this request to determine rows and/or columns in a table including the data relevant to the request using one or more predicates, in the case of a SQL request, or one or more filter operations as explained below to select only the relevant data to return to a processor in the host server. This may be referred to as pre-filtering.

After the processor in the proxy server sends the one or more data communication signals to the processor in the host server, the processor in the proxy server may determine a relevancy context of the first data request (block 806). That is the processor in the proxy server may receive the relevancy context data on the first network connection and determine that the data requested by the host server may only be a subset of data that may be used to execute an application currently executing on the host server. For example, an application executing on the host server may ingest data stored on a storage device to execute the application, but the processor in the host server may only require a subset of data determined by one or more parameters instead of all of the data to execute the application, and the subset of data may correspond to data associated with the first data request.

The process may progress to block 808, after completing block 806, and the processor in the proxy server may execute one or more computer-executable instructions that may cause the processor to send a second data request to a storage array for data corresponding to the first data request using a second network connection. As explained above, the processor in the storage array may send one or more electrical signals to a disk controller that may cause the disk controller to transform electromagnetic signals corresponding to the requested data into electrical signals and send an electrical signal back to the processor in the storage device including data corresponding to the requested data. The data corresponding to the requested data may not be just the requested data, but may include more than just the requested data. For example, the first data request may be for a subset of the data that may be returned from the disk drive, but the disk controller may return data including the subset of data.

The process may then progress to block 810, and the processor in the proxy server may receive the data from the storage array in response to sending the second data request on the second network connection. The process may then progress to block 812, and the processor may determine a first set of data based at least in part on the data and the relevancy context of the first data requested. In particular, the processor in the proxy server may execute one or more computer-executable instructions stored in a memory that may cause the processor to filter the data received from the disk drives so that only the requested subset of data is returned to the processor in the host server. The processor in the proxy server may execute computer-executable instructions that may cause the processor to implement an output filter operation (e.g., Output Filter 527), to determine the first set of data.

After the process completes block 812, the process may progress to block 814 and the processor in the proxy server may send the first set of data to the processor in the host server. After the processor in the proxy server sends the first set of data to the processor in the host server process 800 may end.

Figure 9:
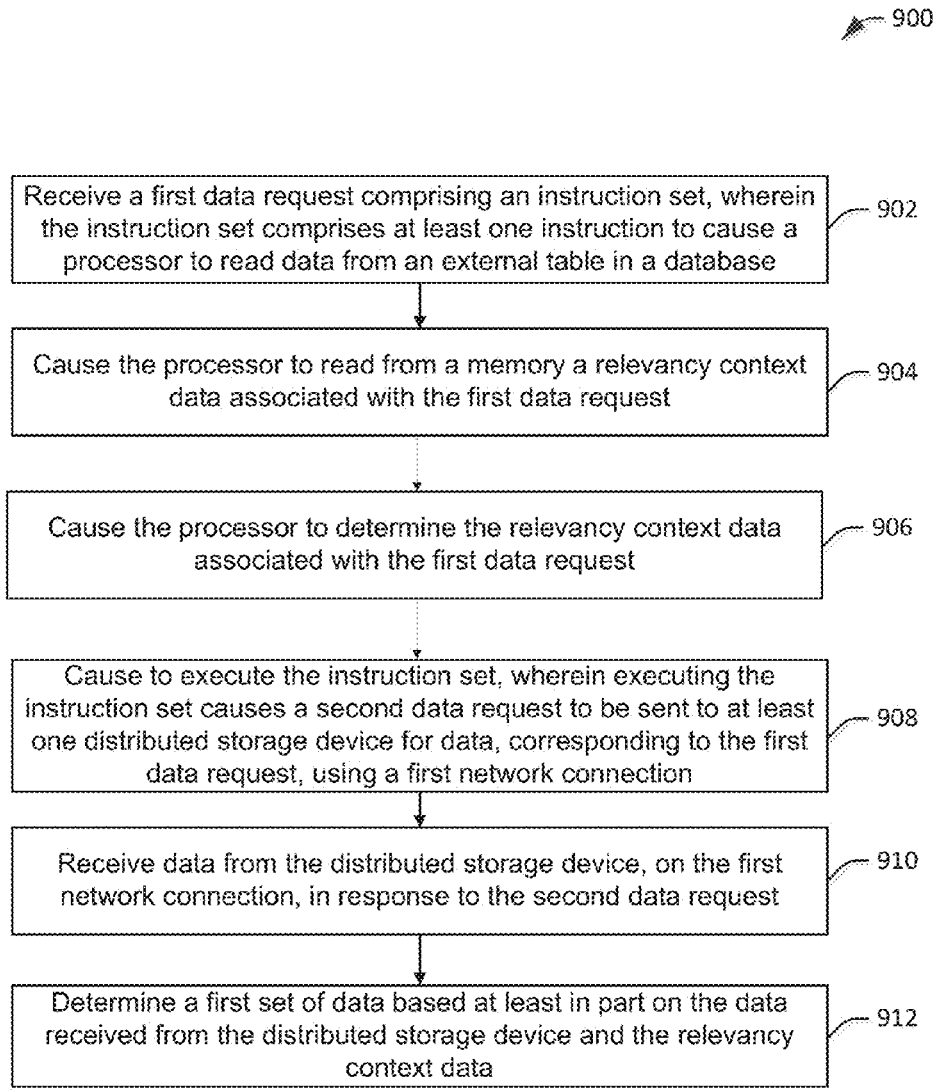
FIG. 9 depicts an illustrative process for requesting data from a storage device, in accordance with one or more embodiments of the disclosure.

FIG. 9 depicts an illustrative process for requesting data from a storage device, in accordance with one or more embodiments of the disclosure. One or more processors may perform one or more steps of a process (e.g., Process 900) including one or more blocks that may occur in the same order as shown in FIG. 9 or may occur in another order.

The process may begin at block 902, wherein a processor (e.g., one of Processor(s) 609) in a host server (e.g., Host Server 605) receives a first data request, from a user device, including an instruction set, wherein the instruction set including at least on instruction to cause the processor to read data from an external table in a database. The database may be a RDBMS stored on the host server. The external table in the database may be one or more computer-executable instructions stored in a memory (e.g., Memory 607) that may be executed by the processor in the host server which may cause one or more data stored on a distributed storage device (e.g., Distributed Storage 611), external to the host server, to be stored in the memory of the host server. This may enable the processor in the host server to access data that may be requested by an application executing on the processor to quickly access the data without having to send a data communication signal to a distributed storage device for the data.

The process may progress to block 904, wherein the processor in the host server may execute one or more computer-executable instructions that cause the processor to read from the memory a relevancy context data associated with the first data request. The relevancy context data may be data including a structure of the request. For instance, the structure of the request may correspond to specific parameters associated with the request. The parameters may include when the data was stored, how old the data is, a range of data (e.g., data corresponding to a certain time period). For example, the relevancy context data may include one or more parameters associated with sales data for all Mondays in a given year between the hours 11:00 a.m. and 2:00 p.m. Accordingly, the processor may use this request to determine rows and/or columns in a table including the data relevant to the request using one or more predicates, in the case of a SQL request, or one or more filter operations as explained below to select only the relevant data to return to a processor in the host server. This may be referred to as pre-filtering.

After the processor in the host server reads the memory, the processor in the host server may determine a relevancy context associated with the first data request (block 906). That is the processor in the storage device (e.g., distributed storage device) may receive and determine that the data requested by the host server may only be a subset of data that may be used to execute an application currently executing on the host server. For example, an application executing on the processor in the host server may ingest data stored on the distributed storage device to execute the application, but the processor in the host server may only require a subset of data determined by one or more parameters instead of all of the data to execute the application, and the subset of data may correspond to data associated with the first data request.

The process may progress to block 908, and the processor in the host server may execute one or more computer-executable instructions that may cause the processor to send a second data request to at least one distributed storage device for data, corresponding to the first data request, using a first network connection. The processor in the host server may send the second data request to one or more processors on a distributed storage device that may determine where data corresponding to the first data request may be stored on the distributed storage device. In some embodiments, one or more portions of the data corresponding to the first data request may be stored on one or more distributed storage devices spanning multiple continents. For example, a first portion of the data may be stored on a first distributed storage device located in Hong Kong China and a second portion (the remaining portion) of the data may be stored on a second distributed storage device located in Austin Tex. United States of America. Accordingly, the one or more processors on the distributed storage device may execute one or more computer-executable instructions included in the second data request that may determine the location of the data corresponding to the first data request.

After the processor sends the second data request, the process may progress to block 910. At block 910 the processor may receive data from the distributed storage device, on the first network connection, in response to the second data request. After the processor receives the data from the distributed storage device, the process may then progress to block 912, and the processor may determine a first set of data based at least in part on the data received from the distributed storage device and the relevancy context data. In particular, the processor in the host server may execute one or more computer-executable instructions stored in a memory that may cause the processor to filter the data received from the distributed storage device so that only the data requested in the first data request is returned to the processor in the host server. The processor in the host server may execute computer-executable instructions that may cause the processor to implement an output filter operation (e.g., Output Filter 633), to determine the first set of data. The data corresponding to the first data request may not be just the requested data, but may include more than just the requested data. For example, the first data request may be for a subset of the data that may be returned from the distributed storage device, but the distributed storage device may return data including the subset of data. As a result the processor on the host server may execute one or more computer-executable instructions to determine only the relevant subset of data from the returned data.

The processor may then send the first set of data to the user device at block 914. After the processor in the host server sends the first set of data to the user device process 900 may end.

Illustrative systems and methods for filtering data on various storage devices have been described. Some or all of these systems and methods may, but need not, be implemented at least partially using the illustrative networks depicted in FIGS. 1-3 in combination with the schematic diagrams in FIGS. 4-9. It should be appreciated that any of the blocks or steps of any of the methods described herein need not be performed in the order described, may be rearranged or modified, and/or may be omitted entirely, based at least in part on alternative interactions between the components depicted in FIGS. 4-9 or alternative communication interactions between the user device, server devices, and storage devices in FIGS. 1-3. In addition, additional blocks or steps may be introduced beyond those that have been described. Further, any of the blocks or steps described above with respect to any method may be implemented by any number of processors or other programmable devices executing computer-executable instructions that may be stored on one or more computer-readable storage media.

Although embodiments have been described in language specific to structural features and/or methodological acts, it should be appreciated that the disclosure is not necessarily limited to the specific features or acts described. Rather, the specific features and acts are disclosed as illustrative implementations of the embodiments.

That which is claimed is:

1. A system, including:
    at least one first server;
    at least one first storage device;
    at least one memory storing computer-executable instructions; and
    at least one processor configured to access the at least one memory and to execute the computer-executable instructions to:
        determine a first data request from the at least one first server;
        connect to a memory of the at least one first server;
        read a memory of the at least one first server based at least in part on the first data request;
        determine a relevancy context data of the first data request based at least in part on parsing the read memory of the at least one first server;
        cause to send a second data request to the at least one first server for one or more first instructions of the computer-executable instructions, based at least in part on the relevancy context data;

determine the one or more first instructions from the at least one first server;

cause to send a third data request to the at least one first storage device for data corresponding to the first data request, based at least in part on the one or more first instructions;

determine the data from the at least one first storage device using the third data request; and send a first data set of the data to the at least one first server.

2. The system of claim 1 wherein the at least one processor:

determines the first data request using a first network connection; and causes to send the second data request using the first network connection.

3. The system of claim 1, wherein the at least one processor:

causes to send the third data request using a second network connection; and determines the data using the second network connection.

4. The system of claim 1, wherein the at least one first server is an application server.

5. The system of claim 1, wherein the at least first storage device is a network attached storage.

6. The system of claim 1, wherein the at least one first storage device is a distributed storage device.

7. The system of claim 1, wherein the first set of data is based at least in part on the relevancy context data.

8. The system of claim 7, wherein the first set of data is a subset of the data.

9. The system of claim 1, wherein the first data request includes one or more user device requests, and the first set of data includes information corresponding to the one or more user device requests.

10. The system of claim 1, wherein the relevancy context data includes one or more parameters about the first data request.

11. A non-transitory computer-readable media storing computer-executable instructions, which when executed by one or more processors cause the one or more processors to perform operations of:

determining a first data request from at least one first server;

connecting to a memory of the at least one first server;

reading a memory of the at least one first server based at least in part on the first data request;

determining a relevancy context data of the first data request based at least in part on parsing the read memory of the at least one first server;

causing to send a second data request to the at least one first server for one or more first instructions of the computer-executable instructions, based at least in part on the relevancy context data;

determining the one or more first instructions from the at least one first server;

causing to send a third data request to at least one first storage device for data corresponding to the first data request, based at least in part on the one or more first instructions;

determining the data from the at least one first storage device using the third data request; and sending a first data set of the data to the at least one first server.

12. The non-transitory computer-readable media of claim 11, wherein the computer-executable instructions further include instructions to cause the one or more processors to perform operations of:

determining the first data request using a first network connection; and causing to send the second data request using the first network connection.

13. The non-transitory computer-readable media of claim 11, wherein the computer-executable instructions further include instructions to cause the one or more processors to perform operations of:

causing to send the third data request using a second network connection; and determining the data using the second network connection.

14. The non-transitory computer-readable media of claim 11, wherein the at least one first server is an application server.

15. The non-transitory computer-readable media of claim 11, wherein the at least first storage device is a network attached storage.

16. The non-transitory computer-readable media of claim 11, wherein the at least one first storage device is a distributed storage device.

17. The non-transitory computer-readable media of claim 11, wherein the first set of data is based at least in part on the relevancy context data.

18. A method including:

determining a first data request from at least one first server;

connecting to a memory of the at least one first server;

reading a memory of the at least one first server based at least in part on the first data request;

determining a relevancy context data of the first data request based at least in part on parsing the read memory of the at least one first server;

causing to send a second data request to the at least one first server for one or more first computer-executable instructions, based at least in part on the relevancy context data;

determining the one or more first computer-executable instructions from the at least one first server;

causing to send a third data request to at least one first storage device for data corresponding to the first data request, based at least in part on the one or more first instructions;

determining the data from the at least one first storage device using the third data request; and sending a first data set of the data to the at least one first server.

* * * * *

UNITED STATES PATENT AND TRADEMARK OFFICE
CERTIFICATE OF CORRECTION

PATENT NO. : 10,069,916 B2
APPLICATION NO. : 15/166137
DATED : September 4, 2018
INVENTOR(S) : Poder et al.

It is certified that error appears in the above-identified patent and that said Letters Patent is hereby corrected as shown below:

On the Title Page

Please add Kerry Osborne, Colleyville, TX (US) to the list of inventors, Item (72).

Signed and Sealed this
Thirtieth Day of April, 2019

Andrei Iancu
*Director of the United States Patent and Trademark Office*